US011608780B2

(12) United States Patent
Karafillis et al.

(10) Patent No.: US 11,608,780 B2
(45) Date of Patent: Mar. 21, 2023

(54) UNIT CELL STRUCTURES INCLUDING STIFFENING PATTERNS

(71) Applicant: General Electric Company, Schenectady, NY (US)

(72) Inventors: Apostolos Karafillis, Lynn, MA (US); Jonathan H. Kerner, Lynn, MA (US); Eric Dean Jorgensen, Lynn, MA (US); Leonardo Ajdelsztajn, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/550,885

(22) Filed: Dec. 14, 2021

(65) Prior Publication Data
US 2022/0120219 A1 Apr. 21, 2022

Related U.S. Application Data

(63) Continuation of application No. 17/074,209, filed on Oct. 19, 2020, now Pat. No. 11,230,971.

(51) Int. Cl.
| | | |
|---|---|---|
| *F02C 7/00* | (2006.01) | |
| *F01D 25/24* | (2006.01) | |
| *F01D 25/26* | (2006.01) | |

(52) U.S. Cl.
CPC ............... *F02C 7/00* (2013.01); *F01D 25/24* (2013.01); *F01D 25/26* (2013.01); *F05D 2220/323* (2013.01)

(58) Field of Classification Search
CPC . F02C 7/00; F01D 25/24; F01D 25/26; F05D 2220/323
See application file for complete search history.

(56) References Cited

U.S. PATENT DOCUMENTS

| | | |
|---|---|---|
| 4,725,334 A | 2/1988 | Brimm |
| 5,771,680 A | 6/1998 | Zahedi et al. |
| 7,840,389 B2 | 11/2010 | Gallet et al. |
| 9,690,887 B2 | 6/2017 | Coudouent et al. |
| 10,464,239 B2 | 11/2019 | Lyons et al. |

(Continued)

OTHER PUBLICATIONS

Index of /archive/Engines/F404, "p0054510.jpg" [Retrieved from the Internet on May 6, 2020]. Retrieved from the Internet: http://imagery.vnfawing.com/archive/Engines/F404/p0054510.jpg (1 page).

(Continued)

*Primary Examiner* — Jacob M Amick
(74) *Attorney, Agent, or Firm* — Hanley, Flight & Zimmerman, LLC

(57) ABSTRACT

Methods, apparatus, systems and articles of manufacture are disclosed for a structure of an engine component, including a first plurality of unit cells offset from a neutral plane in a first direction, a second plurality of unit cells offset from the neutral plane in a second direction, a plurality of nodes joining ones of the first plurality of unit cells and ones of the second plurality of unit cells, wherein the first plurality of unit cells and the second plurality of unit cells are arranged in pairs such that ones of the first plurality of unit cells are laterally adjacent to and interconnected with ones of the second plurality of unit cells, and wherein the structure is a stiffened structure.

20 Claims, 13 Drawing Sheets

(56) References Cited

U.S. PATENT DOCUMENTS

| | | |
|---|---|---|
| 11,230,971 B1* | 1/2022 | Karafillis .................. F02K 1/82 |
| 2016/0279708 A1 | 9/2016 | Hann et al. |
| 2016/0325520 A1 | 11/2016 | Berger |
| 2017/0212979 A1 | 7/2017 | Cheng |
| 2017/0226891 A1* | 8/2017 | Twelves, Jr. .......... B32B 15/011 |
| 2018/0046740 A1 | 2/2018 | Coudouent et al. |
| 2018/0299066 A1 | 10/2018 | Erno et al. |
| 2019/0264610 A1 | 8/2019 | Martino-Gonzalez et al. |
| 2019/0271237 A1 | 9/2019 | Martin et al. |

OTHER PUBLICATIONS

Recent News, "Clinkenbeard Completes Full Scale Mockup of Pratt & Whitney's F135 Engine for the F-35 Lightning II" [Retrieved from the Internet on May 6, 2020], Retrieved from the Internet: http://www.mechanicalprototypes.com/news/F135-engine-full-scale-mockup.html (4 pages).

"F414" [Retrieved from the Internet on May 6, 2020], Retrieved from the Internet: https://www.mtu.de/engines/military-aircraft-engines/fighter-aircraft/f414/ (2 pages).

United States Patent and Trademark Office, "Notice of Allowance and Fee(s) Due," issued in connection with U.S. Appl. No. 17/074,209, dated Sep. 14, 2021, 9 pages.

* cited by examiner

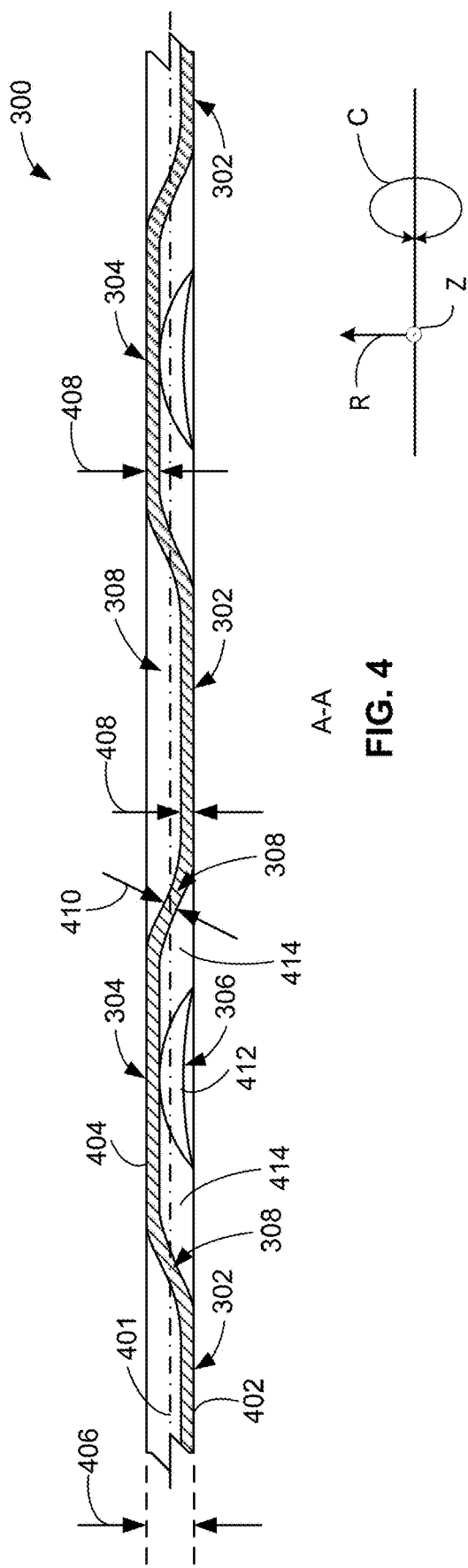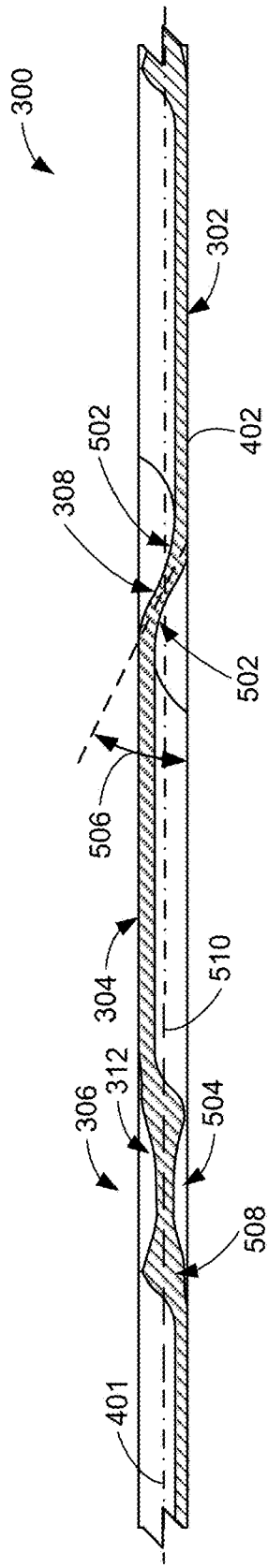
A-A
FIG. 4
B-B
FIG. 5

C-C

UNIT CELL STRUCTURES INCLUDING STIFFENING PATTERNS

CROSS-REFERENCE TO RELATED APPLICATIONS

This patent arises from a continuation of U.S. patent application Ser. No. 17/074,209, filed on Oct. 19, 2020, which is a non-provisional application. Priority is claimed to U.S. patent application Ser. No. 17/074,209, which is incorporated herein by reference in its entirety.

FIELD OF THE DISCLOSURE

This disclosure relates generally to gas turbines and, more particularly, to unit cell structures including stiffening patterns.

BACKGROUND

A gas turbine engine generally includes, in serial flow order, an inlet section, a compressor section, a combustion section, a turbine section, and an exhaust section. In operation, air enters the inlet section and flows to the compressor section where one or more axial compressors progressively compress the air until it reaches the combustion section, thereby creating combustion gases. The combustion gases flow from the combustion section through a hot gas path defined within the turbine section and then exit the turbine section via the exhaust section.

A gas turbine engine such as a turbofan includes a bypass duct wholly or partially surrounding a core turbine engine of the turbofan including the compressor section, the combustion section, the turbine section, and the exhaust section. The operation and orientation of the turbofan during flight of the aircraft induce an overturning moment, axial compressive forces, and/or torsion on components and/or structures the turbofan such as a bypass duct, fan casing, and/or cowl, etc.

BRIEF SUMMARY

Methods, apparatus, systems, and articles of manufacture corresponding to unit cell structures including stiffening patterns are disclosed.

Certain examples provide for a structure of an engine component, the structure including a first plurality of unit cells offset from a neutral plane in a first direction. The example structure also includes a second plurality of unit cells offset from the neutral plane in a second direction. The example structure also includes a plurality of nodes joining ones of the first plurality of unit cells and ones of the second plurality of unit cells wherein the first plurality of unit cells and the second plurality of unit cells are arranged in pairs such that ones of the first plurality of unit cells are laterally adjacent to and interconnected with ones of the second plurality of unit cells, and wherein the structure is a stiffened structure.

Certain examples provide for a structure surrounding a gas turbine, the structure including a first plurality of unit cells. The example structure also includes a second plurality of unit cells, the first plurality of unit cells offset from the second plurality of unit cells with respect to a neutral plane to increase a moment of inertia of the structure, ones of the first plurality of unit cells alternating with ones of the second plurality of unit cells to define the structure such that the unit cells are laterally adjacent, and the first and second pluralities of unit cells are offset from each other and with respect to the neutral plane that defines a center line through the structure. The example structure also includes a plurality of nodes joining the first plurality of unit cells with the second plurality of unit cells.

Certain examples provide for a unit cell structure of an aircraft component, the unit cell structure including a first plurality of unit cells. The example unit cell structure also includes a second plurality of unit cells offset from the first plurality of unit cells in a first direction, the first plurality of unit cells and second plurality of unit cells forming opposing surfaces, ones of the first plurality of unit cells alternating with ones of the second plurality of unit cells such that the unit cells are laterally adjacent, the first and second surfaces offset from each other and with respect to a neutral plane that defines a center line through the unit cell structure. The example unit cell structure also includes a plurality of nodes joining the first plurality of unit cells and the second plurality of unit cells to stiffen the unit cell structure.

Certain examples provide for an additively manufactured monolithic isogrid structure, the additively manufactured monolithic isogrid structure including a first plurality of trigonal unit cells disposed on a first side of a neutral plane for bending of the isogrid structure. The example additively manufactured monolithic isogrid structure also includes a second plurality of trigonal unit cells disposed on a second side of the neutral plane, the second side opposite the first side. The example additively manufactured monolithic isogrid structure also includes a plurality of nodes. The example additively manufactured monolithic isogrid structure also includes a plurality of transition edges, the plurality of nodes and the plurality of transition edges connecting the first and second pluralities of unit cells.

Certain examples provide for an integral additively manufactured grid structure, the integral additively manufactured grid structure including a first plurality of square unit cells defining a first surface, the first plurality of square unit cells disposed on a first side of a neutral plane for bending of the grid structure. The example integral additively manufactured grid structure also includes a second plurality of square unit cells defining a second surface, the second plurality of square unit cells disposed on a second side of the neutral plane opposite the first side, the second plurality joined to the first plurality with pluralities of (a) nodes intersecting the neutral plane and (b) transition edges intersecting the neutral plane.

BRIEF DESCRIPTION OF THE DRAWINGS

FIG. 4 is a cross-section of the first panel of FIG. 3A taken along the A-A cutting line of FIG. 3B FIG. 5 is another cross-section of the first panel of FIG. 3A taken along the B-B cutting line of FIG. 3B.

Figure 1:
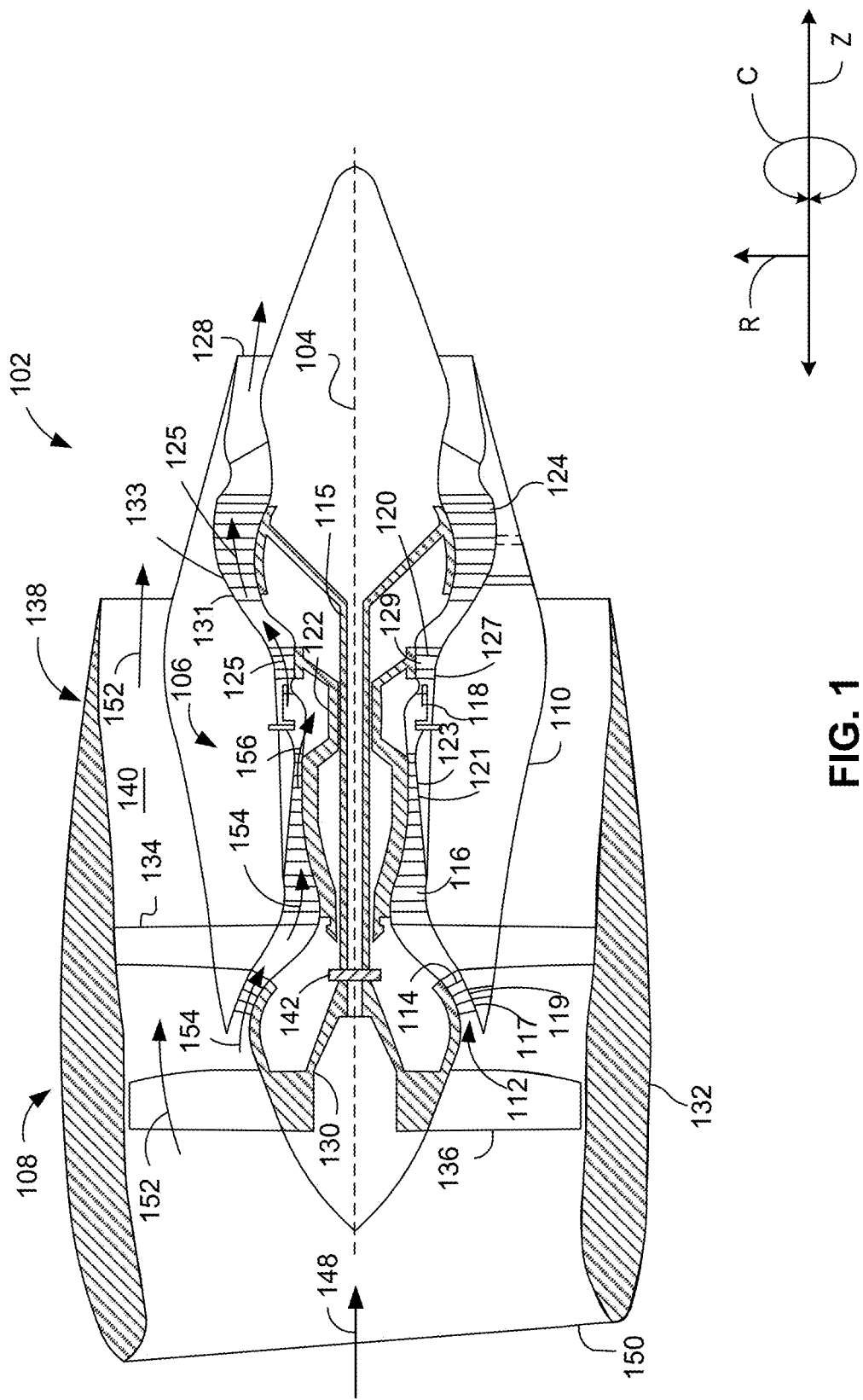
FIG. 1 is a schematic cross-sectional view of an example high-bypass turbofan-type gas turbine engine.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts. Although the figures show layers and regions with clean lines and boundaries, some or all of these lines and/or boundaries may be idealized. In reality, the boundaries and/or lines may be unobservable, blended, and/or irregular.

Descriptors "first," "second," "third," etc., are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

An overturning moment (e.g., a bending moment), axial compressive forces, and torsion are induced on a gas turbine engine such as a turbofan of an aircraft during flight due to the thrust, orientation, and operation of the turbofan. The overturning moment, axial compressive forces, and torsion can cause displacement, deformation, and/or buckling of structures (e.g., components) of the turbofan such as a bypass duct, a fan casing, a compressor casing, cowls, and/or nacelle, etc. For example, the structures can buckle from excessive compressive forces and/or an excessive overturning moment. Certain examples disclosed herein provide for a stiffening pattern for unit cell structures to increase the strength of the unit cell structures and reduce displacement, deformation, and/or buckling of the unit cell structures. Certain examples disclosed herein can be manufactured using additive manufacturing techniques and can cause low aerodynamic disturbance.

The terms "upstream" and "downstream" refer to the relative direction with respect to fluid flow in a fluid pathway. For example, "upstream" refers to the direction from which the fluid flows, and "downstream" refers to the direction to which the fluid flows. As used herein, "vertical" refers to the direction perpendicular to the ground. As used herein, "horizontal" refers to the direction parallel to the centerline of the gas turbine engine. As used herein, "lateral" refers to the direction perpendicular to the axial and vertical directions (e.g., into and out of the plane of FIG. 1, etc.).

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Gas turbine engines such as turbofans of the high-bypass type and low-bypass type experience operational loads, causing overturning moments, compressive forces, and torsion during flight. The overturning moment is a bending moment from fore to aft of a turbofan induced due to the orientation and operation of an aircraft. Axial compressive forces are also induced in the turbofan due to the orientation and operation of the aircraft during flight. Torsion is induced in the turbofan, for example, due to the operation of internal components of the turbofan (e.g., due to rotation of compressor rotors and turbine rotors, etc.). Cylindrical or partially cylindrical structural components (e.g., backbone structures, structures, etc.) of the turbofan, such as a bypass duct, a fan casing, a compressor casing, cowls, and/or a nacelle, particularly experience the overturning moment, compressive forces, and/or torsion. The overturning moment, axial compressive forces, and torsion can increase during an imbalance event such as the loss of a fan blade of a fan, a compressor blade of a compressor, and a turbine blade of a turbine of the turbofan. Further, the overturning moment, axial compressive forces, and torsion can increase due to inertial loads caused by harsh landings, aircraft maneuvers involving high acceleration (e.g., high gravitational force equivalent (g-force)), etc.

The cylindrical structures (e.g., components) of the turbofan such as the bypass duct, the fan casing, the compressor casing, the engine cowls, the nacelle, exhaust, and/or afterburner, etc., include one or more walled structures (e.g., shells). The overturning moment, compressive forces, and/or torsion can cause stresses that lead to compression, out-of-plane deformation, and/or buckling of the walled structures of the cylindrical structures and can lead to failure of the component. To prevent deformation and buckling due to the stresses induced by the overturning moment, compressive forces, and/or torsion, it is desirable to increase the stiffness of the structures. The overturning moment, compressive forces, and/or torsion induce stresses in in the cylindrical structures along the circumferential direction, the axial direction, and at angles therebetween. Accordingly, it is desirable to increase stiffness of the cylindrical engine structures in an isotropic manner to protect against deformation and bucking in all directions.

As used herein, the term "unit cell" refers to a fundamental structure or "building block" that repeats in regular intervals to form a solid structure. Unit cells typically are the same size and same shape, but can vary in size and/or shape in the surface they define. A surface of unit cells with varying shapes and different shapes is explained in more detail with respect to FIG. 9B and FIG. 9C.

As used herein, the term "grid" or "array" means a solid surface composed of solid repeating unit cells. This two dimensional grid or array can also be called a "lattice" which is defined as a solid surface, rather than as a collection of nodes or points forming empty holes or openings in a variety of shapes.

As used herein, the term "laterally adjacent" means to share a common edge or neighbor. For example, the squares on a chess board are laterally adjacent as the black and white squares form a two-dimensional 8 by 8 grid, with many squares sharing common edges. Laterally adjacent objects do not have to be in the same vertical plane. Laterally adjacent objects can be connected and offset (e.g., above and below) a neutral plane that defines a center line through the structure.

An example surface can be created from a first plurality or set of unit cells laterally adjacent to and interconnected with a second plurality or set of unit cells, where cells in the first plurality of unit cells are offset from a neutral plane in a first radial direction and cells in the second plurality of unit cells are offset from the neutral plane in a second radial direction. The interconnected first and second pluralities of unit cells define a solid surface that alternates in offset with respect to the neutral plane, wherein the structure is a stiffened structure (e.g., formed of or including a stiffening pattern, etc.).

Some cylindrical structures are formed from a grid of unit cells at uniform radial locations (e.g., in-line unit cells) accompanied with ribs extending radially outward from the structures at the edges of the unit cells to increase stiffness (e.g., conventional isogrids). However, because the ribs of cylindrical structures with conventional isogrids are transversely unsupported structures (e.g., radially extending structures) of low volume, it can be difficult to form the cylindrical structures using additive manufacturing techniques. In the event that the cylindrical structures with conventional isogrids are formed using additive manufacturing techniques, extensive post-processing machining is often necessary. Further, the ribs of the cylindrical structures including conventional isogrids can extend as far as 0.5 inches or more radially outward from one or more cylindrical faces of the cylindrical structures, causing adverse aerodynamic interruptions.

Example stiffening patterns (also referred to as stiffening structures or stiffened structures) disclosed herein increase the stiffness of isogrid structures such as those included in turbofan structures and/or components such as the bypass duct, the fan casing, the compressor casing, liner(s), the nacelle, and/or the engine cowls, etc., by implementing two opposing surfaces (or surface subsets) of unit cells connected at nodes (e.g., forming a stiffening pattern). The opposing surfaces of the isogrid structures disclosed herein cause an increased moment of inertia relative to conventional isogrids. For example, the increased moment of inertia is computationally determined due to the geometry of the stiffening patterns. The increased moment of inertia improves the isotropic stiffness of the structure. Example structures are formed with stiffening patterns including pairs of alternating recessed (e.g., inboard with respect to a neutral plane or axis) and protruding (e.g., outboard with respect the neutral plane or axis) trigonal unit cells laterally adjacent and integral with one another. Alternatively or additionally, example structures are formed with stiffening patterns including alternating recessed (e.g., inboard) and protruding (e.g., outboard) trigonal unit cells laterally adjacent and integral with one another that increase in size along the surface. Example structures additionally or alternatively include square unit cells, rectangular unit cells, hexagonal unit cells, etc. For example, the moment of inertia (e.g., the second moment of area) is increased due to the alternating recessed and protruding unit cell local centers of mass and/or centers of cross sectional area, reducing bending in the panel due to applied forces and/or moments. For example, the location of a cross sectional centroid, a neutral plane, and/or other neutral reference of a structure including stiffening patterns disclosed herein is between the recessed and protruding unit cells, increasing the moment of inertia and strength and reducing bending. The protruding unit cells are offset in the radial, or normal, direction from the recessed unit cells (surrounding the neutral plane of bending), for example. Example structures include varying shape and density for local increased bending stiffness to accommodate concentrated loads, such as the loads introduced by the inertial loads of accessories mounted on ducts of aircraft engines. Structures formed with stiffening patterns disclosed herein can be readily machined using additive manufacturing techniques such as powder bed fusion (PBF), electron beam melting (EBM), selective laser sintering (SLS), Cold Spray Additive Manufacturing (CSAM), superplastic forming, hog out and mill, nonconventional chemical milling, direct metal laser sintering (DMLS), etc.) and/or subtractive manufacturing tools and techniques (e.g., computer numerical control (CNC) milling, Electrochemical Machining (ECM), etc.) Additionally or alternatively, structures formed with stiffening patterns disclosed herein can be machined from wrought material with machining tools and/or with chemical machining processes, can be cast, etc.

Further, example stiffening patterns disclosed herein allow for a lower total height and/or thickness when compared to structures including conventional isogrids with protruding ribs. Accordingly, stiffening patterns disclosed herein can be implemented in connection with aircraft components exposed to air flow without creating as much aerodynamic disturbance as the conventional isogrids.

As described above, material such as cylindrical structures including stiffening patterns can be used to implement portions of a high-bypass and/or low-bypass gas turbine engine. Referring now to the drawings, wherein identical numerals indicate the same elements throughout the figures, FIG. 1 is a schematic cross-sectional view of an example high-bypass turbofan-type gas turbine engine 102 ("turbofan 102") in which components can be implemented from material with stiffening patterns. The turbofan 102 is described to provide some example components and illustrate example operating conditions in which such stiffening structures can be implemented.

As shown in FIG. 1, the turbofan 102 defines a longitudinal or axial centerline axis 104 extending therethrough for reference. The turbofan 102 defines a set of axes in curvilinear coordinates: a radial axis, R, a circumferential axis, C, and a longitudinal axis, Z. The longitudinal axis Z extends generally parallel to the longitudinal axis 104, and the radial axis R extends orthogonally outwardly from the longitudinal axis 104 (in all directions). The circumferential axis C is measured by the angle Theta (θ) that (the radius) extends around the circumference. As used herein, an angle Theta of 0 degrees is a flat surface of thickness or radius r and length z, while an angle Theta of 360 degrees completes an entire cylinder of thickness or radius r and length z. A flat surface with angle Theta of 0 degrees can be extended parallel along plane, instead of bent into a curve with an example angle Theta of 10 degrees or a full cylinder with an angle Theta of 360 degrees. The turbofan 102 includes a core turbine or gas turbine engine 106 disposed downstream from a fan section 108.

The core turbine engine 106 includes a substantially tubular outer casing 110 that defines an annular inlet 112. The outer casing 110 can be formed from a single casing or multiple casings. The outer casing 110 encloses, in serial flow relationship, a compressor section having a booster or low pressure compressor 114 ("LP compressor 114") and a high pressure compressor 116 ("HP compressor 116"), a combustion section 118, a turbine section having a high pressure turbine 120 ("HP turbine 120") and a low pressure turbine 124 ("LP turbine 124"), and an exhaust section 128. A high pressure shaft or spool 122 ("HP shaft 122") drivingly couples the HP turbine 120 and the HP compressor 116. A low pressure shaft or spool 115 ("LP shaft 115") drivingly couples the LP turbine 124 and the LP compressor 114. The LP shaft 115 can also couple to a fan spool or shaft 130 of the fan section 108. In some examples, the LP shaft 115 can couple directly to the fan shaft 130 (i.e., a direct-drive configuration). In alternative configurations, the LP shaft 115 couples to the fan shaft 130 via a reduction gear 142 (e.g., an indirect-drive or geared-drive configuration).

As shown in FIG. 1, the fan section 108 includes a plurality of fan blades 136 coupled to and extending radially outwardly from the fan shaft 130. An annular fan casing or nacelle 132 circumferentially encloses the fan section 108 and/or at least a portion of the core turbine 106. The nacelle 132 can be supported relative to the core turbine 106 by a plurality of circumferentially-spaced apart outlet guide vanes 134. Furthermore, a downstream section 138 of the nacelle 132 encloses an outer portion of the core turbine 106 to define a bypass airflow passage 140 therebetween.

As illustrated in FIG. 1, air 148 enters an inlet portion 150 of the turbofan 102 during operation thereof. A first portion 152 of the air 148 flows into the bypass flow passage 140, while a second portion 154 of the air 148 flows into the inlet 112 of the LP compressor 114. One or more sequential stages of LP compressor stator vanes 117 and LP compressor rotor blades 119 coupled to the LP shaft 115 progressively compress the second portion 154 of the air 148 flowing through the LP compressor 114 en route to the HP compressor 116. Next, one or more sequential stages of HP compressor stator vanes 121 and HP compressor rotor blades 123 coupled to the HP shaft 122 further compress the second portion 154 of the air 148 flowing through the HP compressor 116. This provides compressed air 156 to the combustion section 118 where it mixes with fuel and burns to provide combustion gases 125.

The combustion gases 125 flow through the HP turbine 120 where one or more sequential stages of HP turbine stator vanes 127 and HP turbine rotor blades 129 coupled to the HP shaft 122 extract a first portion of kinetic and/or thermal energy therefrom. This energy extraction supports operation of the HP compressor 116. The combustion gases 125 then flow through the LP turbine 124 where one or more sequential stages of LP turbine stator vanes 131 and LP turbine rotor blades 133 coupled to the LP shaft 115 extract a second portion of thermal and/or kinetic energy therefrom. This energy extraction causes the LP shaft 115 to rotate, thereby supporting operation of the LP compressor 114 and/or rotation of the fan shaft 130. The combustion gases 125 then exit the core turbine 106 through the exhaust section 128 thereof.

Along with the turbofan 102, the core turbine 106 serves a similar purpose and sees a similar environment in land-based gas turbines, turbojet engines in which the ratio of the first portion 152 of the air 148 to the second portion 154 of the air 148 is less than that of a turbofan, and unducted fan engines in which the fan section 108 is devoid of the nacelle 132. In each of the turbofan, turbojet, and unducted engines, a speed reduction device (e.g., the reduction gearbox 142) may be included between any shafts and spools. For example, the reduction gearbox 142 may be disposed between the LP shaft 115 and the fan shaft 130 of the fan section 108.

In the illustrated example of FIG. 1, stiffening patterns (also referred to as stiffening structures or stiffened structure) disclosed herein can be implemented in connection with structures of the turbofan 102 having, for example, cylindrical or annular properties. A fan casing, a bypass duct (e.g., an exterior, interior, or entirety of the bypass duct), and/or cowls of the nacelle 132 can include the stiffening patterns disclosed herein. One or more casings of the outer casing 110, such as a compressor casing, can also include the stiffening patterns disclosed herein. Further, though the stiffening patterns are discussed in connection with the high-bypass-type turbofan 102, stiffening patterns disclosed herein can also be implemented in connection with low-bypass-type turbofans. For instance, a dedicated bypass duct can extend from a fan casing at the fore of a low-bypass-type turbofan towards the aft of the low-bypass-type turbofan and can include stiffening patterns disclosed herein. Further, an exhaust/afterburning section casing, a fan casing, a compressor casing, a cowl, and/or a nacelle, etc., of the low-bypass-type turbofan can also include the stiffening patterns disclosed herein. The stiffening patterns can also be used to form a liner for a turbine engine. The stiffening pattern formed in the structure provides resistance to buckling such as due to compressive pressure loading and/or other inward loading.

More specifically, under compressive loading, a structure can be deformed by buckling and/or bending due to the differential pressure (delta P). Certain examples provide a structure forming a surface that can help resist such buckling and/or bending effects caused by compressive loading (e.g., experienced by a turbine engine in operation, etc.). In some turbine engines, the combustion chambers are high compression systems in which high pressure air and fuel are mixed and burned at a constant pressure. The combustion chamber is lined with a combustor or engine liner, which is subjected to a high delta P in operation. Certain examples provide a stiffening structure that can be used to form a pressure-resistant combustor liner to resist buckling and/or bending effects. Other turbine engine parts can be formed of such structure to resist buckling and/or bending due to delta P (e.g., inward) loading and/or other compressive pressure, for example.

Figure 2:
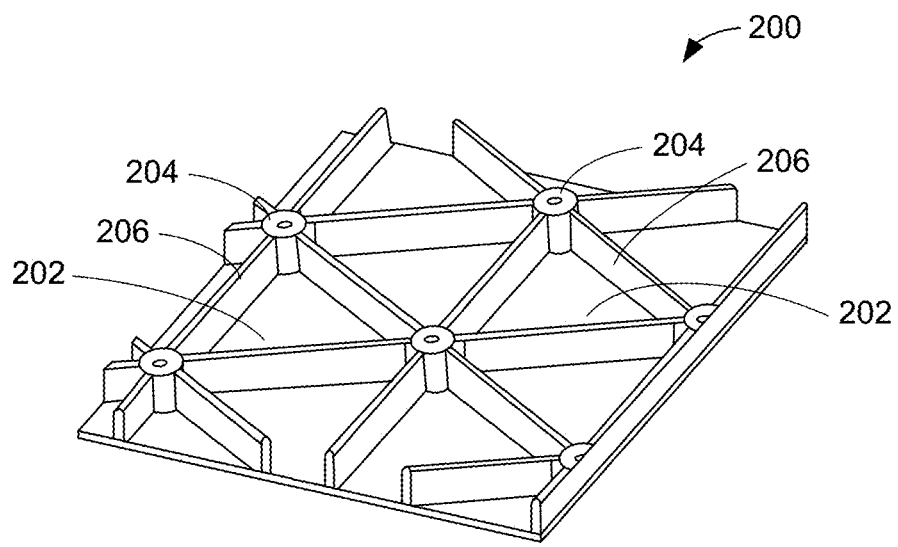
FIG. 2 is a perspective view of a known conventional isogrid structure.

FIG. 2 is a perspective view of a known conventional isogrid structure 200 (e.g., a conventional isogrid 200, etc.). The known conventional isogrid structure 200 includes conventional unit cells 202, each defined between three conventional nodes 204 and three conventional ribs 206. Though only a portion of the conventional unit cells 202, the conventional nodes 204, and the conventional ribs 206 are labeled in FIG. 2, the unlabeled portions of the known conventional isogrid structure 200 also include the described arrangement of the conventional unit cells 202, the conventional nodes 204, and the conventional ribs 206. Conventional isogrids, such as the conventional isogrid structure 200, are load bearing structures characterized by nodes 204 and/or the ribs 206 adhered to a plate, each pair of nodes, ribs and plate portion defining a unit cell 202. As used herein, a "node" adjoins two or more unit cells at a corner of each unit cell. For example, a unit cell can be square, rectangular, or trigonal, etc. Cylindrical structures formed in the manner of the known conventional isogrid structure 200 include the conventional unit cells 202 at uniform radial locations (e.g., in-line unit cells), with the conventional nodes and ribs 204, 206 extending radially outward and/or inward from the structures at the edges of the conventional unit cells 202. However, because the conventional nodes and ribs 204, 206 are transversely unsupported structures (e.g., radially extending structures) of low volume, it can be difficult to form the cylindrical structures using additive manufacturing techniques. In the event that the cylindrical structures are formed using additive manufacturing techniques, extensive post-processing machining is often necessary. Further, the conventional ribs 206 of the cylindrical structures including conventional isogrids can extend as far as 0.5 inches or more radially outward from one or more cylindrical faces of the cylindrical structures, causing adverse aerodynamic interruptions.

Figure 3A:
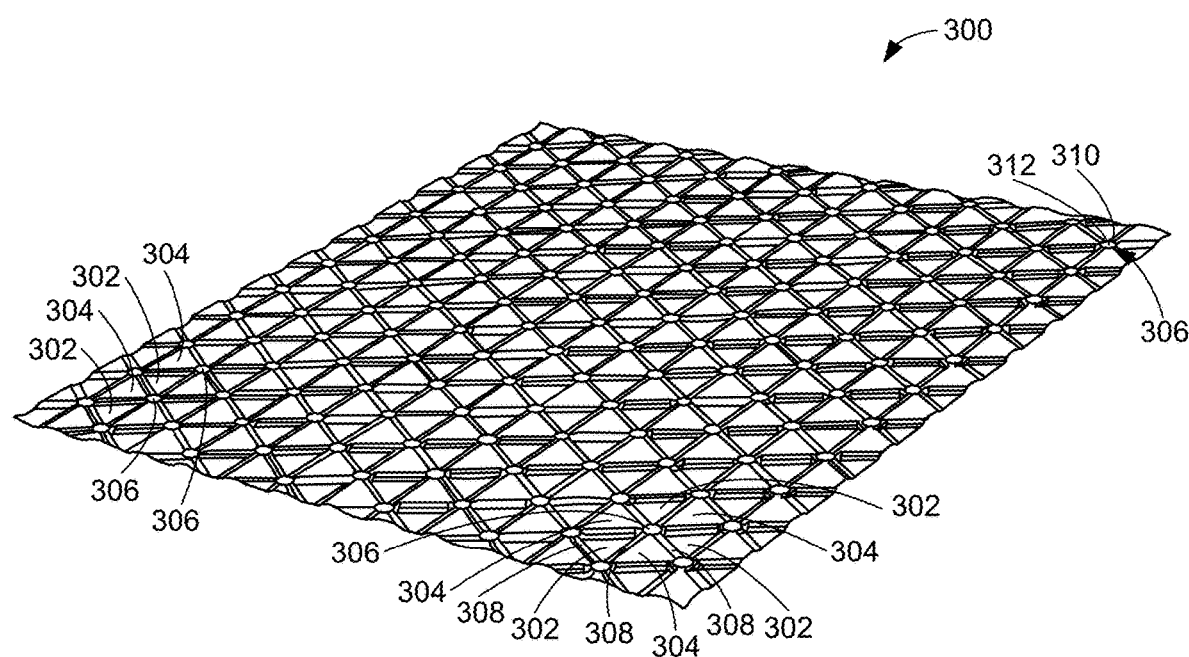
FIG. 3A is a perspective view of an example first panel including a stiffening pattern for unit cell structures.

FIG. 3A is a perspective view of an example first panel 300 including an example stiffening pattern for unit cell structures that can be implemented in connection with the teachings of this disclosure. In some examples, the stiffening pattern for unit cell structures of the first panel 300 can be implemented in connection with at least a portion of a cylindrical structure or a frustoconical structure. In FIG. 3A, the first panel 300 includes recessed unit cells 302 and protruding unit cells 304 (e.g., relative to the conventional unit cells 202 of the conventional unit cell structure 200 and/or a neutral plane of the first panel 300) surrounding nodes 306. In FIG. 3A, the recessed unit cells 302 and the protruding unit cells 304 are equilateral triangles (e.g., trigonal). Each recessed unit cell 302 is joined to three of the protruding unit cells 304 at respective transition edges 308. Similarly, each protruding unit cell 304 is joined to three of the recessed unit cells 302 at respective ones of the transition edges 308. Each of the recessed unit cells 302 and the protruding unit cells 304 is joined to three of the nodes 306 and is joined to one of the nodes 306 at each corner of the unit cell, like the arrangement of the conventional unit cell 202. Three of the recessed unit cells 302 and three of the protruding unit cells 304 are joined to a node 306. However, unlike conventional nodes 204, the nodes 306 are adjoined to the recessed and protruding unit cells 302, 304 at opposing ends of the nodes 306. Though only a portion of the recessed unit cells 302, the protruding unit cells 304, the nodes 306, and the transition edges 308 are labeled in examples provided herein, the unlabeled portions of the first panel 300 and other structures implementing the stiffening patterns disclosed herein also include the described arrangement of the recessed unit cells 302, protruding unit cells 304, transition edges 308, and nodes 306. The recessed unit cells 302 collectively define a first plurality or set of unit cells (e.g., a first plurality of trigonal unit cells, etc.). The recessed first plurality of unit cells 302 are offset from the neutral plane in a first radial direction and are interconnected by nodes. The protruding unit cells 304 collectively define a second plurality or set of unit cells (e.g., a second plurality of trigonal unit cells, etc.). The protruding second plurality of unit cells 304 are offset from the neutral plane in a second radial direction and are interconnected by nodes. While trigonal unit cells are provided as an example, the first and/or second plurality of unit cells can include rectangular and/or square unit cells in a waffle grid arrangement, cells of differing sizes, cells of differing shapes, etc.

In FIG. 3A, the alternating arrangement of the recessed unit cells 302 and the protruding unit cells 304 creates opposing surfaces (e.g., surfaces displaced from one another) by aligning the recessed unit cells 302 opposed from the protruding unit cells 304. A first surface is defined by the recessed unit cells 302, and a second surface is defined by the protruding unit cells 304. The nodes 306 join the first surface to the second surface (e.g., collectively, the opposing surfaces) by joining alternating ones of the recessed unit cells 302 and the protruding unit cells 304 to one another. The first surface is displaced (e.g., offset) a distance on the radial axis R from the second surface in a normal (e.g., 90 degrees, perpendicular, orthogonal) direction, increasing the moment of inertia of the first panel 300 and increasing the resistance of the first panel 300 to bending such as out-of-plane bending or buckling. Ones of the recessed unit cells 302 alternate with ones of the protruding unit cells 304 such that the cells are laterally adjacent forming a grid arrangement. In the example of FIG. 3A, the first direction is normal or orthogonal to the first surface. Further, because each unit cell of the recessed and protruding unit cells 302, 304 is an equilateral triangle (e.g., trigonal), the first panel 300 has increased resistance to bending regardless of the axis on the panel 300 about which the panel 300 is bent and/or has isotropic macroscopic properties. In other examples, each unit cell of the recessed and protruding unit cells 302, 304 are square unit cells and have orthotropic macroscopic properties (e.g., orthotropic grid structures), forming a waffle grid. In FIG. 3A, the nodes 306 include outer edges 310 surrounding first recesses 312. Though only one of the outer edges 310 and one of the first recess 312 are labeled on one of the nodes 306, each node 306 on the first panel 300 includes an outer edge 310 and a first recess 312. It is important to note that each unit cell does not need to have isotropic macroscopic properties.

In FIG. 3A, the stiffening pattern created by two offset (e.g., protruding and recessed) pluralities of unit cells 302, 304, joined by nodes stiffens the structure. The stiffened structure (discussed further in connection with FIG. 4) is planar (e.g., non-cylindrical) because the stiffening pattern is disposed on the first panel 300, which does not include an overarching curvature (e.g., an overarching curvature associated with a cylindrical and/or annular structure). In other examples, the opposing surfaces (e.g., the first and second surfaces) defined by the recessed unit cells 302 and the protruding unit cells 304 can be annular surfaces, cylindrical surfaces, etc. An example implementation of the stiffening pattern of the first panel 300 of FIG. 3A is described in greater detail in connection with a cylindrical structure shown in FIG. 7.

Figure 3B:
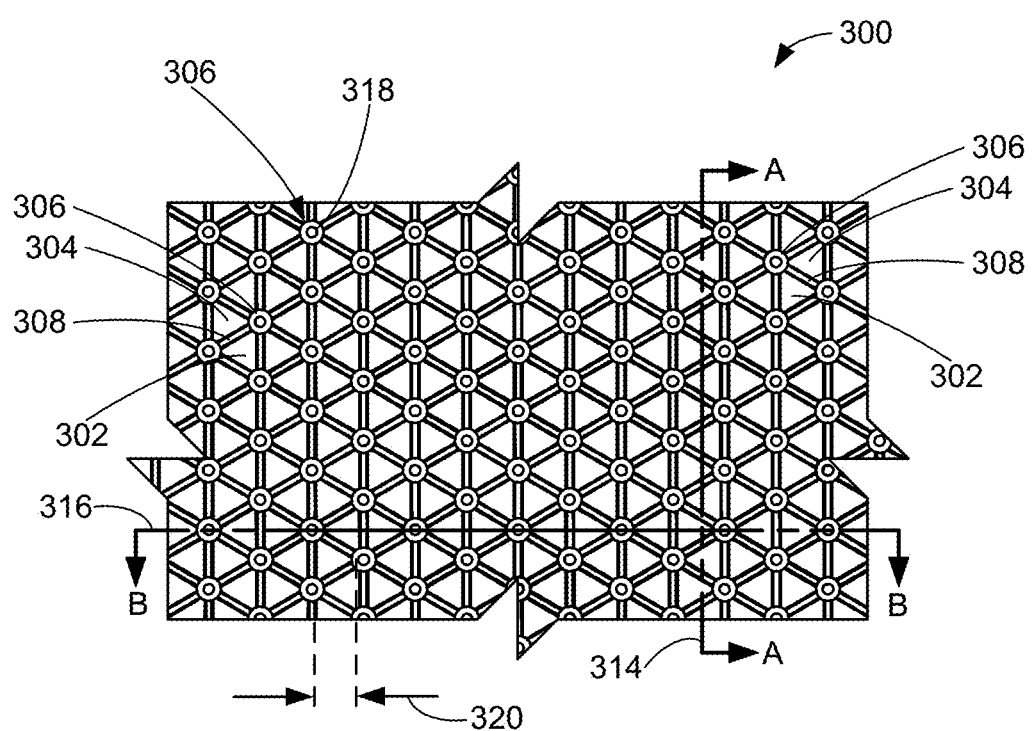
FIG. 3B is a front view of the first panel of FIG. 3A showing an example cutting line A-A and an example cutting line B-B.

FIG. 3B is a front view of the first panel 300 of FIG. 3A showing a cutting line A-A 314 and a cutting line B-B 316. In the view of FIG. 3B, the first panel 300 is broken at each side. Thus, a portion of the recessed unit cells 302, the protruding unit cells 304, the nodes 306, and the transition edges 308 (all of FIG. 3A) of the first panel 300 appear in the view of FIG. 3B. The nodes 306 are shown with first contour lines 318 to illustrate the first recesses 312 (FIG. 3A). A first distance 320 indicates a triangle height of a unit cell of the recessed and protruding unit cells 302, 304. In some examples, the first distance 320 is 2 inches (or approximately 2 inches±0.01 inches, etc.). In some examples, the first distance 320 is between 1 inch and 3 inches.

Figure 7:
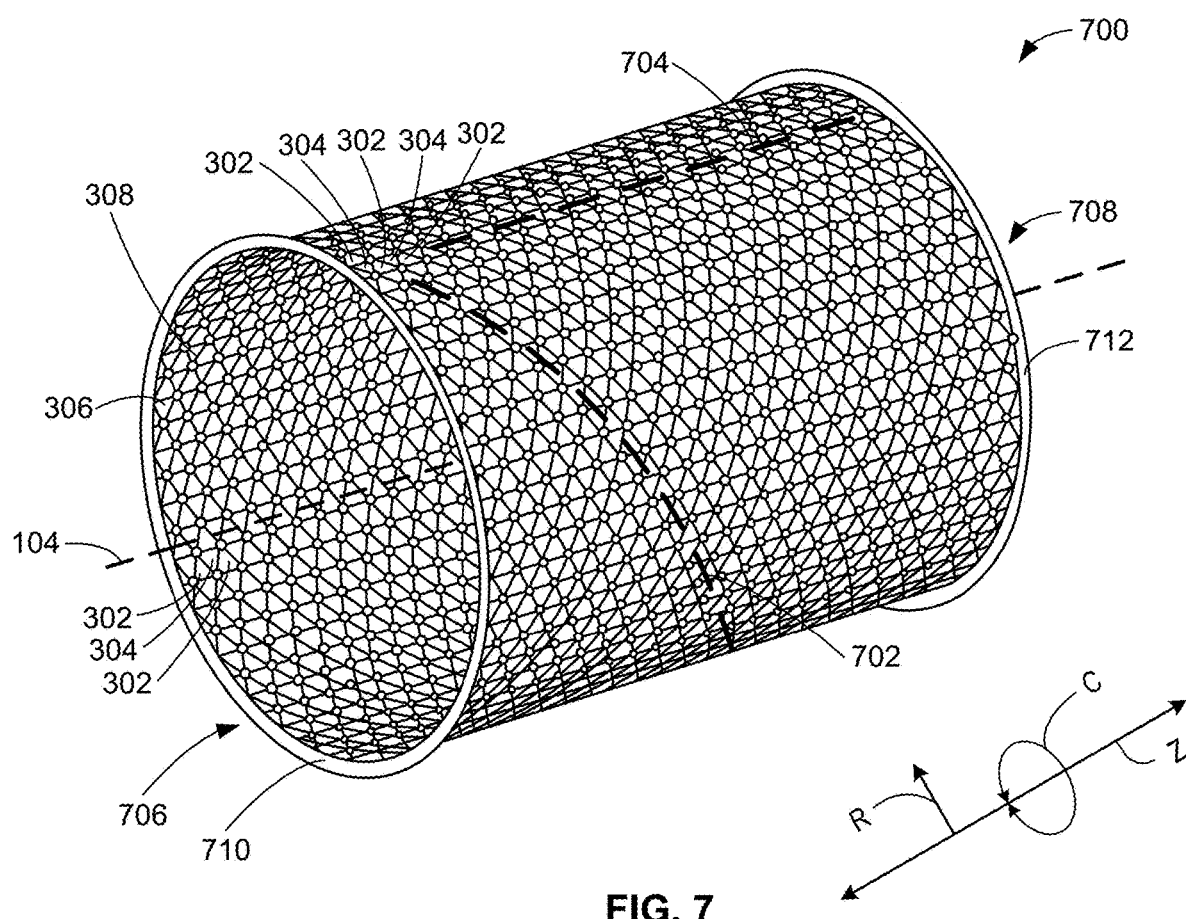
FIG. 7 is a perspective view of an example cylindrical structure including the stiffening pattern for unit cell structures of FIGS. 3A-6.

FIG. 4 is an enlarged view of a cross-section of the first panel 300 of FIG. 3A taken along the A-A cutting line 314 of FIG. 3B. In the view of FIG. 4, the first panel 300 is broken at each side. A portion of the recessed unit cells 302 and the protruding unit cells 304 (both of FIG. 3A) appear in the view of FIG. 4. In FIG. 4, the cut of the A-A cutting line 314 is taken perpendicular to the triangle height of the unit cells 302, 304 indicated by the first distance 320 (FIG. 3B) and the cut of the A-A cutting line 314 is displaced approximately half of the first distance 320 (e.g., triangle height) from edges of alternating ones of the recessed unit cells 302 and the protruding unit cells 304. In FIG. 4, a first dashed-dotted line 401 indicates a neutral plane for bending (e.g., the location measured between second surface 404 and first surface 402 where the in-plane shear stress is zero when subjected to bending about the longitudinal axis Z, where the longitudinal axis Z extends perpendicularly into and/or out of the page in FIG. 4. If the example cross section of the first panel 300 is bent completely about the longitudinal axis Z, then a cylindrical structure is created as the direction around the circumferential axis C will revolve completely around a circle (e.g. Theta is 360), as seen in FIG. 7. However, the example of FIG. 4 is a non-cylindrical sheet with a Theta of 0, not experiencing any bending, with unit cells laterally adjacent along the longitudinal axis (e.g., front and back) and laterally adjacent side to side (e.g., left and right). The unit cells 302, 304 are laterally adjacent and, thus, share a common edge despite being radially offset in the radial direction R. The neutral plane indicated by the dashed-dotted line 401 divides the first panel 300 into a first portion (e.g., a first portion including each of the protruding unit cells 304, relatively higher on the page in the view of FIG. 4) and a second portion (e.g., a second portion including each of the recessed unit cells 302, relatively lower on the page in the view of FIG. 4). The surface or structure of the example panel 300 that is created by the interconnection of the first plurality of unit cells 302 and the second plurality of unit cells 304 is a continuous, solid surface that alternates between two planes (e.g., the protruding plane and the recessed plane) at an offset distance from the neutral plane. Similarly, the neutral plane indicated by the first dashed-dotted line 401 intersects each of the nodes 306 and the transition edges 308 of the first panel 300. In some examples, stiffening patterns disclosed herein include curvature. In these examples, the neutral plane is not necessarily planar (e.g., straight) throughout, but locally divides the recessed and the protruding unit cells 302, 304.

As such, stiffening patterns can be implemented with respect to a neutral plane to define a variety of structures in a variety of shapes (e.g., curved, flat, angled, etc.). For example, a helical structure can be formed including the stiffening patterns disclosed herein including a corresponding helical neutral plane extending through the helical structure dividing recessed unit cells (e.g., the recessed unit cells 302) from protruding unit cells (e.g., the protruding unit cells 304). As another example, an exterior of an airfoil (e.g., including a leading edge, a trailing edge, and a chord) can be formed including the stiffening patterns disclosed herein including a neutral plane having the curvature and shape of the exterior of the airfoil dividing recessed unit cells (e.g., unit cells closer to the center of the airfoil) from protruding unit cells (e.g., unit cells farther from the center of the airfoil). As yet another example, an ovoid structure can be formed including the stiffening patterns disclosed herein including an ovoid neutral plane separating protruding unit cells from recessed unit cells.

In the orientation of FIG. 4, a first plurality or set or collection 402 is defined by (e.g., aligned with, in the same plane as) the recessed unit cells 302. Similarly, a second plurality or set or collection 404 is defined by (e.g., aligned with, in the same plane as) the protruding unit cells 304. A second distance 406 (e.g., an offset in the R direction) indicating the total thickness of the first panel 300 is defined by the first surface 402 and the second surface 404 (e.g., between the lower face of the recessed unit cells 302 and the upper face of the protruding unit cells 304). In some examples, the second distance 406 is 0.3 inches (or approximately 0.3 inches±0.01 inches, etc.). Stiffening patterns disclosed herein allow for a lower total height and/or thickness (e.g., the second distance 406) when compared to structures including conventional isogrids such as the conventional isogrid structure 200 (FIG. 2).

A third distance 408 of the first panel 300 is a thickness of a recessed unit cell 302 and/or a protruding unit cell 304. In some examples, the third distance 408 is 0.025 inches (or 0.025 inches±0.01 inches, etc.). In some examples, the third distance 408 is between 0.025 inches and 0.5 inches. In some examples, the tolerance of the third distance 408 is between ±0.005 inches and ±0.01 inches.

A fourth distance 410 is a thickness of a transition edge 308 of the first panel 300. The fourth distance 410 can be a web thickness (e.g., a thickness of a connecting portion such as the transition edge 308) of the first panel 300. In some examples, the fourth distance 410 is 0.025 inches (or 0.025 inches±0.01 inches, etc.). In some examples, the fourth distance 410 is between 0.025 inches and 0.05 inches. In some examples, the tolerance of the fourth distance 410 is between ±0.005 inches and ±0.01 inches.

In FIG. 4, underbodies 412 of the nodes 306 are visible. The underbodies 412 are positioned at the intersections of example undersides 414 of transition edges 308. The underbodies 412 are rounded, for example, to allow for the first recesses 312 (FIG. 3A) of the nodes 306. The underbodies 412 and, more generally, the nodes 306 encompass portions of the edges of the unit cells 302, 304 to increase stiffness of the first panel 300. In some examples, a first portion of the unit cells 302, 304 have one or more different dimensions (e.g., different values of the first distance 320, the second distance 406, the third distance 408, and/or the fourth distance 410, etc.) from a second portion of the unit cells 302, 304.

FIG. 5 is another enlarged cross-section of the first panel 300 of FIG. 3A taken along the B-B cutting line 316 of FIG. 3B. In the view of FIG. 5, the first panel 300 is broken at each side. In FIG. 5, the cut of the B-B cutting line 316 bisects the nodes 306 (FIG. 3A). In FIG. 5, the first panel 300 includes example fillets 502 at the interfaces of the recessed unit cells 302 and the transition edges 308 and at the interfaces of the protruding unit cells 304 and the transition edges 308. The fillets 502 have a radius of 0.55 inches (e.g., ±0.01 inches, etc.), for example.

In the view of FIG. 5, the node 306 is shown bisected, revealing a cross section of the first recess 312. In FIG. 5, an underside of the node 306 includes a second recess 504. The inclusion of the first recess 312 and the second recess 504 can reduce the material used for the stiffening pattern of the first panel 300. In FIG. 5, the transition edge 308 extends from the recessed unit cell 302 at a first angle 506 relative to the first surface 402 (FIG. 4). For example, the first angle 506 can be 30°±5° inches. In some examples, the first angle 506 is less than 90° such that the first panel 300 can be formed using an additive manufacturing process.

Visible in the view of FIG. 5 is an annular thickened portion 508 of the node 306. The thickened portion 508 defines the first recess 312 and the second recess 504 of the node 306. Further, the thickened portion 508, the first recess 312, and the second recess 504 of the node 306 demonstrate that the node 306 is substantially symmetrical about an example third dashed line 510. As used herein, "substantially symmetrical" refers to a condition in which the portion of the node 306 below the third dashed line 510 can be rotated 180°±10° to take the shape of the portion of the node 306 above the third dashed line 510. In some examples, the remainder of the first panel 300 displays this symmetry.

Figure 6:
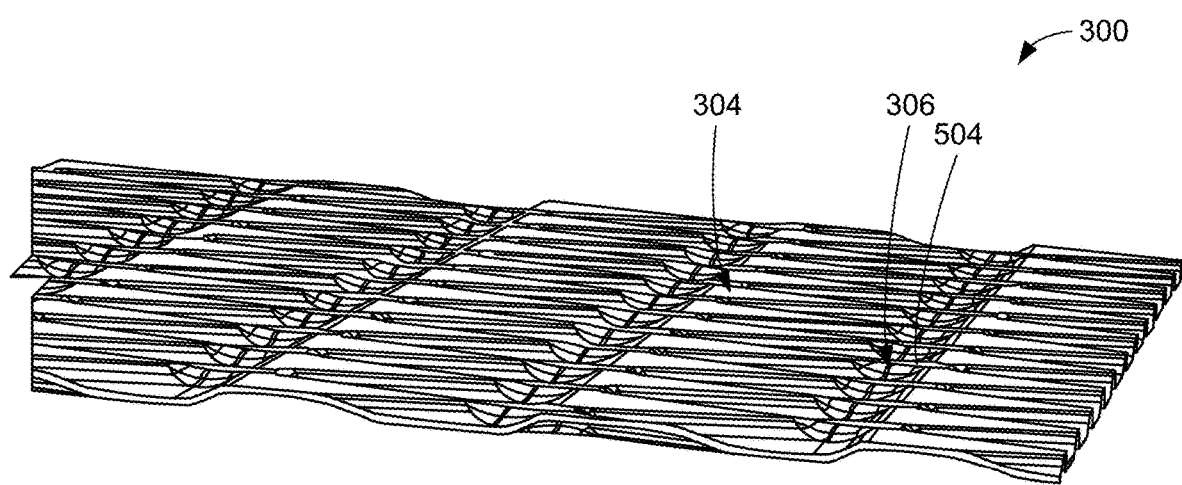
FIG. 6 is another perspective view of the first panel of FIG. 3A showing the reverse side of the first panel.

FIG. 6 is another perspective view of the first panel 300 of FIG. 3A showing the reverse side of the first panel 300. The view of FIG. 6 illustrates an underside of the recessed unit cells 302, and further illustrates the symmetry present in the first panel 300. The second recesses 504 of the nodes 306 are also shown in the view of FIG. 6. FIG. 6 is an example "sheet" or non-cylindrical surface, with an angle Theta of zero degrees that is also extended parallel to a neutral plane. FIG. 7 depicts the example sheet of FIG. 6 formed into a cylinder by bending the sheet about the longitudinal axis Z for an angle Theta of 360 degrees.

FIG. 7 is a perspective view of an example cylindrical structure 700 that can be implemented including the stiffening pattern for unit cell structures of FIGS. 3A-6 (e.g., the stiffening pattern of the first panel 300). Alternatively, the cylindrical structure 700 can be a frustoconical structure (e.g., a cylinder with an opening at one end of a specific radius, and the opening at the other end with a differently sized radius). In FIG. 7, the cylindrical structure 700 is discussed in connection with the directional conventions of the turbofan 102 of FIG. 1. For example, a central axis of the cylindrical structure is coincident with the longitudinal and centerline axis 104 of the turbofan 102. In some examples, the cylindrical structure 700 includes all of the aspects of the first panel 300 of FIGS. 3A-6 with geometrical variation to account for the curvature of the cylindrical structure 700. In some examples, the cylindrical structure is a unitary structure (e.g., monolithic, integral, etc.) composed of continuous material.

When implemented in connection with the cylindrical structure 700, the alternating ones of the recessed unit cells 302 and the protruding unit cells 304 form a spiral about the cylindrical structure 700 indicated partially by an example fourth dashed line 702 tracing one such spiral. An example fifth dashed line 704 indicates a linear arrangement of alternating ones of the recessed unit cells 302 and the protruding unit cells 304 parallel with the centerline axis 104. Along both the fourth dashed line 702 and the fifth dashed line 704, the recessed unit cells 302 can be inboard unit cells 302 and the protruding unit cells 304 can be outboard unit cells 304. The inboard unit cells 302 are disposed closer to the centerline axis 104 of the cylindrical structure 700 than the outboard unit cells 304.

In other examples, alternating recessed unit cells 302 and protruding unit cells 304 can be arranged in a ring about the central axis (e.g., longitudinal axis Z) of the cylindrical structure 700 (e.g., a portion of the transition edges 308 are arranged along the circumference of the cylindrical structure 700). The cylindrical structure 700 can be representative of a cylindrical and/or annular structure such as a fan casing, a bypass duct, and/or cowls of the nacelle 132 (FIG. 1) and/or components of a low-bypass-type turbofan, etc. Accordingly, the geometry of the component, such as the fan casing, bypass duct, and/or cowl of the nacelle 132, etc., can include one more contours, edges, protrusions, cavities, bores, etc. (e.g., geometric features), that vary from the shape of the cylindrical structure 700. The arrangement of the stiffening pattern shown in connection with the cylindrical structure 700 can be modified to account for any of these geometric features.

In FIG. 7, the opposing surfaces formed by the recessed unit cells 302 and the protruding unit cells 304 are cylindrical surfaces. A first cylindrical surface is defined by the recessed unit cells 302, and a second cylindrical surface is defined by the protruding unit cells 304, the recessed unit cells 302 and the protruding unit cells 304 together forming the cylindrical structure 700. Locally, the arrangement of the recessed unit cells 302 relative to the protruding unit cells 304 retains a high moment of inertia and isotropic properties. Thus, the arrangement of the cylindrical structure 700 resists bending moments, compressive forces, and torsion. In FIG. 7, the cylindrical structure will have a varying neutral plane throughout defining a cylindrical shell separating each of the recessed unit cells 302 from each of the protruding unit cells 304. To form a cylindrical structure, such as the cylindrical structure 700, the recessed and/or protruding unit cells 302, 304 are curved (e.g., bend) for an angle Theta of 360 degrees to form the curvature of the cylindrical structure 700. Additionally or alternatively, to form the cylindrical structure, such as the cylindrical structure 700, laterally adjacent ones of the recessed unit cells 302 and/or the protruding unit cells 304, are formed at angles relative to one another. It is important to note that the local arrangement of recessed unit cells 302 relative to the protruding unit cells 304 does not need to be isotropic.

In FIG. 7, the structure 700 is formed of pairs of alternating cells laterally adjacent each other in different directions from the neutral plane. Each pair is formed from a recessed unit cells 302 in alternating arrangement with a protruding unit cell 304 such that the pair of cells 302, 304 is laterally adjacent. The recessed unit cells 302 are offset from the protruding unit cells 304 in a third direction normal to the surface defined by the plurality of unit cells. In the example of FIG. 7, the third direction is a radial direction, such that the protruding unit cells 304 are radially farther from the centerline axis 104 than the recessed unit cells 302. The pairs of recessed unit cells 302 and protruding unit cells 304 form a solid continuous surface that alternates around the neutral plane between the protruding plane and the recessed plane.

In FIG. 7, ones of the recessed unit cells 302 alternate with ones of the protruding unit cells 304 in both of a first and second direction orthogonal to each other. The recessed unit cells 302 are offset from the protruding unit cells 304 in a third direction normal to the first and second directions. In FIG. 7, the first direction is the longitudinal axis Z or centerline axis 104, the second direction is the circumferential direction C, and the third direction is the radial direction R, the protruding unit cells 304 radially farther from the centerline axis 104 than the recessed unit cells 302.

The cylindrical structure 700 includes a first end 706 and a second end 708. The first end 706 includes a first flange 710 extending radially outward therefrom, and the second end 708 includes a second flange 712 extending radially outward therefrom.

The cylindrical structure 700 and analogous aircraft components, such as the fan casing, bypass duct, and/or cowl, etc., can be formed using an additive manufacturing process from, for example, the first end 706 to the second end 708. For example, the cylindrical structure 700 and analogous aircraft components can be formed using additive manufacturing tools and techniques such as PBF, EBM, CSAM, SLS, DMLS, etc., and/or subtractive manufacturing tools and techniques such as CNC milling, ECM, etc., can be used to form the cylindrical structure 700.

Examples disclosed herein provide for a structure (e.g., the cylindrical structure 700 and/or analogous aircraft components) including a first plurality of unit cells (e.g., the recessed unit cells 302) forming a first surface (e.g., the first surface 402 of FIG. 4), a second plurality of unit cells (e.g., the protruding unit cells 304) forming a second surface (e.g., the second surface 404 of FIG. 5), the first and second surfaces opposed to create a high moment of inertia, and a plurality of nodes (e.g., the nodes 306) joining the first surface and the second surface to form a stiffening pattern. The structure can be a cylindrical structure (e.g., the cylindrical structure 700) defining a central axis and a radial direction, the second surface (e.g., the second surface defined by the protruding unit cells 304 of the cylindrical structure 700) radially farther from the central axis than the first surface (e.g., the first surface defined by the recessed unit cells 302 of the cylindrical structure 700). The structure (e.g., the cylindrical structure 700) can form at least a portion of a duct of a turbofan (e.g., the turbofan 102). At least one unit cell of the first plurality of unit cells (e.g., the recessed unit cells 302) or the second plurality of unit cells (e.g., the protruding unit cells 304) of the structure can be trigonal. The structure can include transition edges (e.g., transition edges 308) further joining the first plurality of unit cells (e.g., the recessed unit cells 302), the second plurality of unit cells (e.g., the protruding unit cells 304), and the plurality of nodes (e.g., the nodes 306). At least one node of the plurality of nodes (e.g., the nodes 306) can include a recess (e.g., the first recess 312 and/or the second recess 504). The first plurality of unit cells (e.g., the recessed unit cells 302) can form a first isogrid and the second plurality of unit cells (e.g., the protruding unit cells 304) can form a second isogrid.

Examples disclosed herein provide for a cylindrical structure (e.g., a duct of the turbofan 102 represented by the cylindrical structure 700) surrounding a gas turbine (e.g., the core turbine engine 106) defining a radial direction R and longitudinal direction Z, the cylindrical structure including a first plurality of unit cells (e.g., the recessed unit cells 302) defining a first portion of a surface (e.g., the first surface defined by the recessed unit cells 302 of the cylindrical structure 700), a second plurality of unit cells (e.g., the protruding unit cells 304) defining a second portion of the surface (e.g., the first surface defined by the protruding unit cells 304 of the cylindrical structure 700), the first plurality of cells interconnected with the second plurality of cells in pairs formed of a cell from the first plurality of cells radially adjacent a cell from the second plurality of cells, the cells of the first plurality of cells radially displaced from the cells of the second plurality of cells relative to a central axis (e.g., longitudinal axis) of the cylindrical structure to create a high moment of inertia, and a plurality of nodes (e.g., the nodes 306) joining cells from the first plurality of unit cells with cells from the second plurality of unit cells.

The cylindrical structure can include a plurality of transition edges (e.g., the transition edges 308) to further join the first plurality of unit cells and the second plurality of unit cells. The first plurality of unit cells can be a first plurality of trigonal unit cells and the second plurality of unit cells can be a second plurality of trigonal unit cells. A transition edge of the transition edges can interface with a first edge of a first unit cell of the first plurality of unit cells (e.g., an edge of a recessed unit cell 302), a second edge of a second unit cell of the second unit cells (e.g., an edge of a protruding unit cell 304 adjacent to the recessed unit cell 302), and a node of the plurality of nodes (e.g., the node 306). The cylindrical structure can be associated with an exterior of a duct of a turbofan (e.g., the turbofan 102), for example. Locations of the plurality of nodes can be equidistant. At least one node of the plurality of nodes can include a recess (e.g., the first recess 312 and/or the second recess 504).

Figure 8A:
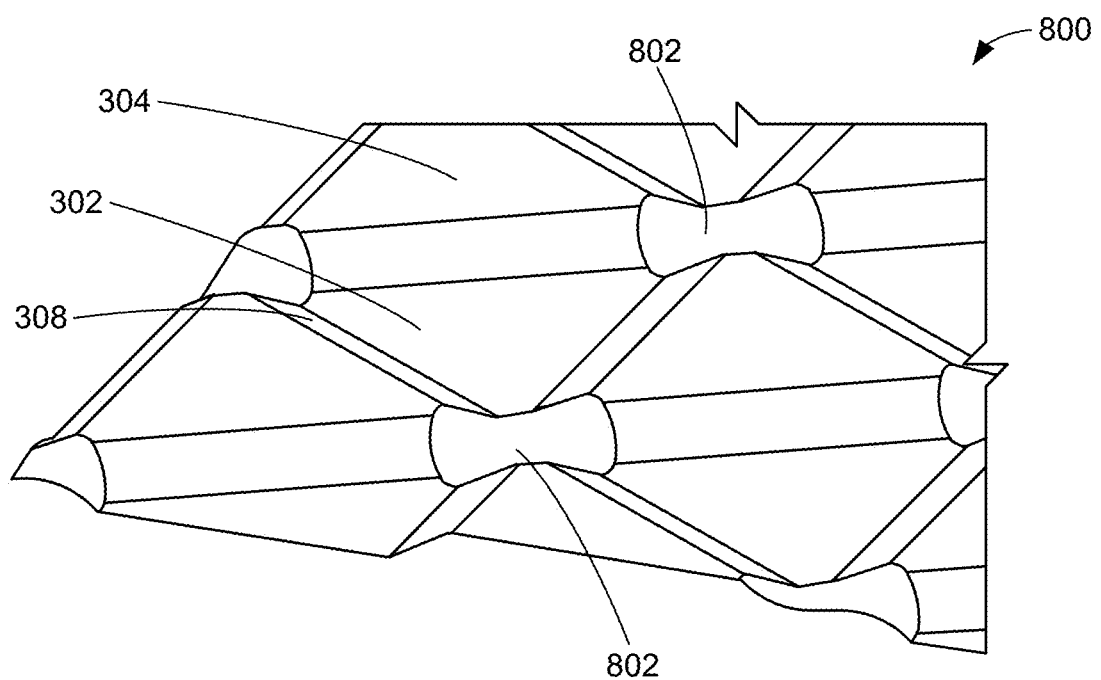
FIG. 8A is a perspective view of an example second panel including alternate nodes for use in the stiffening patterns for unit cell structures of FIGS. 3A-7.

FIG. 8A is a perspective enlarged view of an example second panel 800 including alternate nodes 802 for use in the stiffening patterns for unit cell structures of FIGS. 3A-7. In FIG. 8A, the alternate nodes 802 are blended nodes to decrease material usage and to increase strength. In FIG. 8A, the second panel 800 includes all of the aspects of the first panel 300, save for the nodes 306 (both of FIG. 3A). Though only a portion of the recessed unit cells 302, the protruding unit cells 304, the alternate nodes 802, and the transition edges 308 are labeled in FIG. 8A, the unlabeled portions of the second panel 800 also include the described arrangement of the recessed unit cells 302, protruding unit cells 304, transition edges 308, and alternate nodes 802.

Figure 8B:
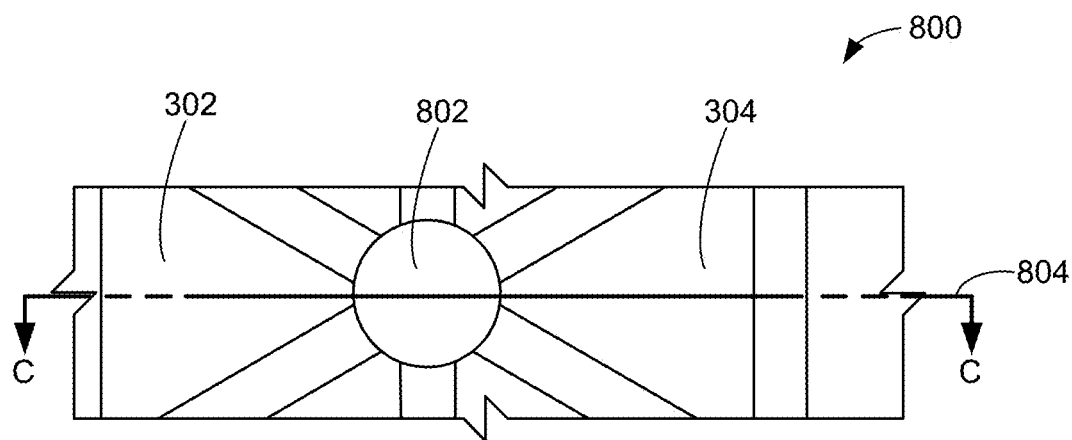
FIG. 8B is a front view of the second panel of FIG. 8A showing an example cutting line C-C.

FIG. 8B is a front view of the second panel 800 of FIG. 8A showing a cutting line C-C 804. As shown in FIG. 8B, the cutting line C-C 804 bisects the alternate node 802 (e.g., the blended node). A recessed unit cell 302 and a protruding unit cell 304 are visible in the view of FIG. 8B.

Figure 8C:
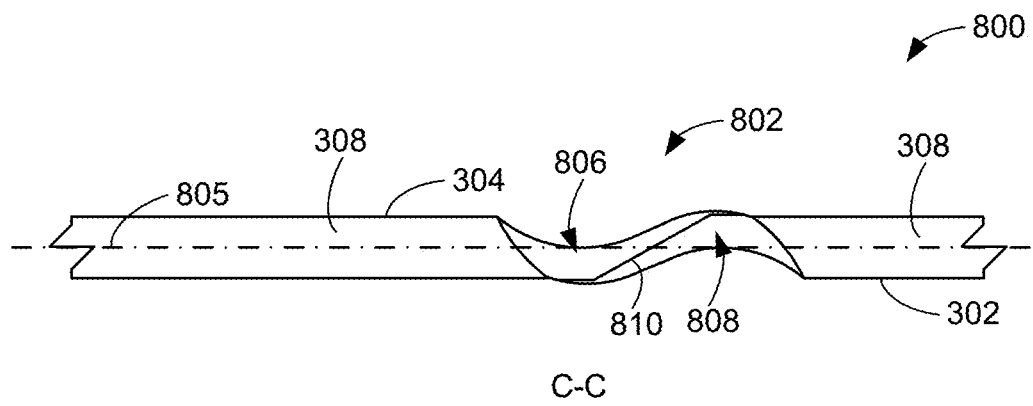
FIG. 8C is a cross-section of the second panel of FIG. 8A taken along the C-C cutting line of FIG. 8B.

FIG. 8C is a cross-section of the second panel 800 of FIG. 8A taken along the cutting line C-C 804 of FIG. 8B. In FIG. 8C, the second panel 800 includes a thin thickness (e.g., a low value of the third and fourth distances 408, 410 of FIG. 4). Both the top side and the underside of the second panel 800 are visible in the view of FIG. 8C. The transition edge 308 proximate the protruding unit cell 304 is visible in the view of FIG. 8C on the top side of the second panel 800. The transition edge 308 proximate the recessed unit cell 302 is visible in the view of FIG. 8C on the underside of the second panel 800. In FIG. 8C, a second dashed-dotted line 805 indicates a neutral plane (e.g., a neutral reference) of the second panel 800. The neutral plane indicated by the second dashed-dotted line 805 is located between the recessed unit cells 302 and the protruding unit cells 304. The neutral plane indicated by the second dashed-dotted line 805 divides the first panel 300 into a first portion (e.g., a first portion including each of the protruding unit cells 304, relatively higher on the page in the view of FIG. 8C) and a second portion (e.g., a second portion including each of the recessed unit cells 302, relatively lower on the page in the view of FIG. 8C). Similarly, the neutral plane indicated by the second dashed-dotted line 805 intersects each of the transition edges 308 of the second panel 800. The alternate node 802 includes a first blended region 806 (e.g., a recess, a well, etc.), shown in FIG. 8C on the top side of the second panel 800. The alternate node 802 includes a second blended region 808 (e.g., a recess, a well, etc.), shown in FIG. 8C on the underside of the second panel 800. In FIG. 8C, the first blended region 806 appears concave up and the second blended region 808 appears concave down. In the example of FIG. 8C, the second blended region 808 can be viewed as a 180° reflection of the first blended region 806 about a node transition 810.

Figure 9A:
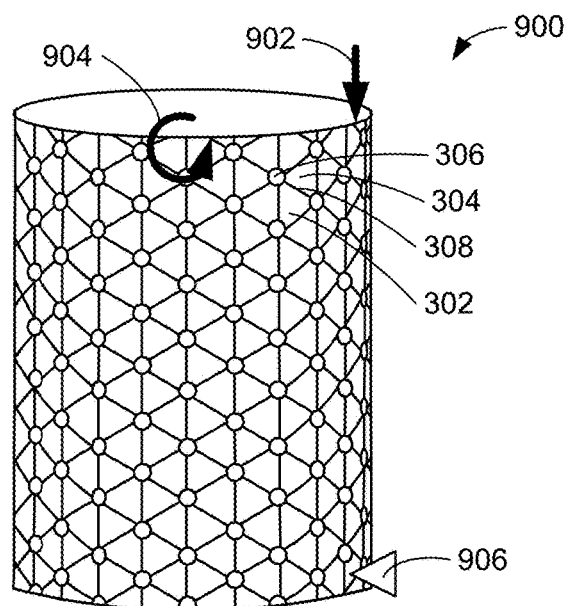
FIG. 9A is a front view of an example cylindrical structure model including the stiffening patterns of FIGS. 3A-8.

FIG. 9A is a front view of an example cylindrical structure model 900 including the stiffening patterns of FIGS. 3A-8C. The cylindrical structure model 900 can be implemented in connection with a Finite Element Analysis (FEA) and/or a Failure Mode and Effects Analysis (FMEA) discussed in further detail in connection with FIG. 10. Generally, the cylindrical structure model 900 includes the same features as the cylindrical structure 700 of FIG. 7, save for the flanges 710, 712 (FIG. 7). Further, the geometry of the unit cells 302, 304, the nodes 306, the transition edges 308, and, more generally, the cylindrical structure model 900 are not to scale with the cylindrical structure 700. The cylindrical structure model 900 includes a thickness of 0.9 in. of the transition edges 308 (e.g., the fourth distance 410 of FIG. 4). The cylindrical structure model 900 includes a thickness of 0.032 in. of the recessed unit cells 302 and the protruding unit cells 304 (e.g., the third distance 408 of FIG. 4). The cylindrical structure model 900 includes a triangle height of 1.57 in. (e.g., the first distance 320 of FIG. 3B). The cylindrical structure model 900 includes a radial height of 0.185 in. (e.g., the second distance 406 of FIG. 4). A compressive load 902 and a moment 904 (e.g., an overturning moment) can be applied to the cylindrical structure model 900, while the cylindrical structure model is constrained by a fixed support 906. In the illustrated example of FIGS. 9A-10, the compressive load 902 and the moment 904 emulate the induced load and moment in the bypass duct of a low-bypass type and/or high-bypass type turbofan.

Figure 9B:
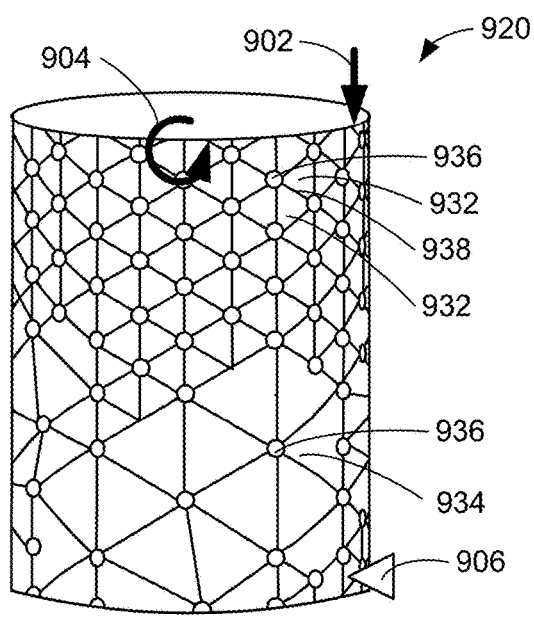
FIG. 9B is a front view of an example cylindrical structure model including the stiffening patterns of FIGS. 3A-8C, wherein the unit cells vary in size throughout the structure.

FIG. 9B is a front view of an example cylindrical structure model 920 including the stiffening patterns of FIGS. 3A-8C. The cylindrical structure model 920 is similar to the example cylindrical structure 900 of FIG. 9A but has unit cells of varying, rather than uniform, size. Further, the geometry of the unit cells 932, 934, the nodes 936, the transition edges 938, and, more generally, the cylindrical structure model 920 are not to scale with the example cylindrical structure 900. The unit cells 932 and 934 are both unit cells, even though unit cell 934 is a larger trigonal shape than unit cell 932. This variation in unit cell size is useful in creating structures of different sizes at different ends, for example.

Figure 9C:
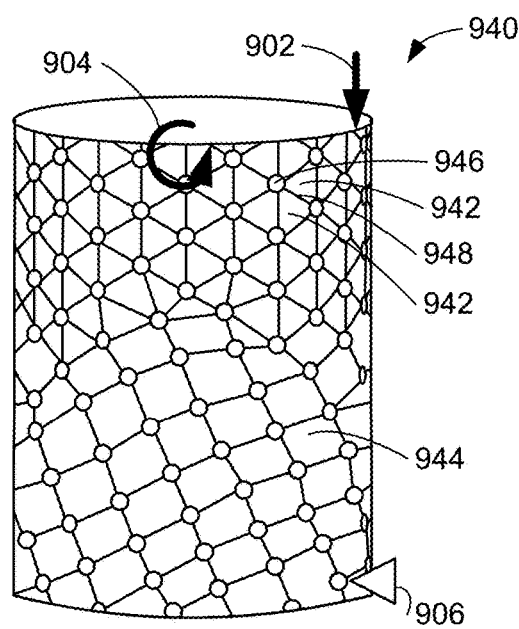
FIG. 9C is a front view of an example cylindrical structure model including the stiffening patterns of FIGS. 3A-8C, wherein the unit cells vary in geometric shape throughout the structure.

FIG. 9C is a front view of an example cylindrical structure model 940 including the stiffening patterns of FIGS. 3A-8C, in which the shape of the unit cells vary. Generally, the cylindrical structure model 940 includes the same features as the cylindrical structure 900 of FIG. 9, but unit cell shape varies. Further, the geometry of the unit cells 942, 944, the nodes 946, the transition edges 948, and, more generally, the cylindrical structure model 940 are not to scale with the example cylindrical structure 900. The unit cell 942 is a small trigonal unit cell, while the unit cell 944 is a larger quadrilateral unit cell. The example structure model 940 illustrates that the unit cells 942, 944 do not have to be the same shape to create a surface. Transition can occur between multiple different unit cells, for example. For example, the unit cell 944 can be a hexagonal unit cell with a transition into a pentagonal unit cell. This variation in unit cell shape is useful in creating structures with transitions, for example.

Figure 10:
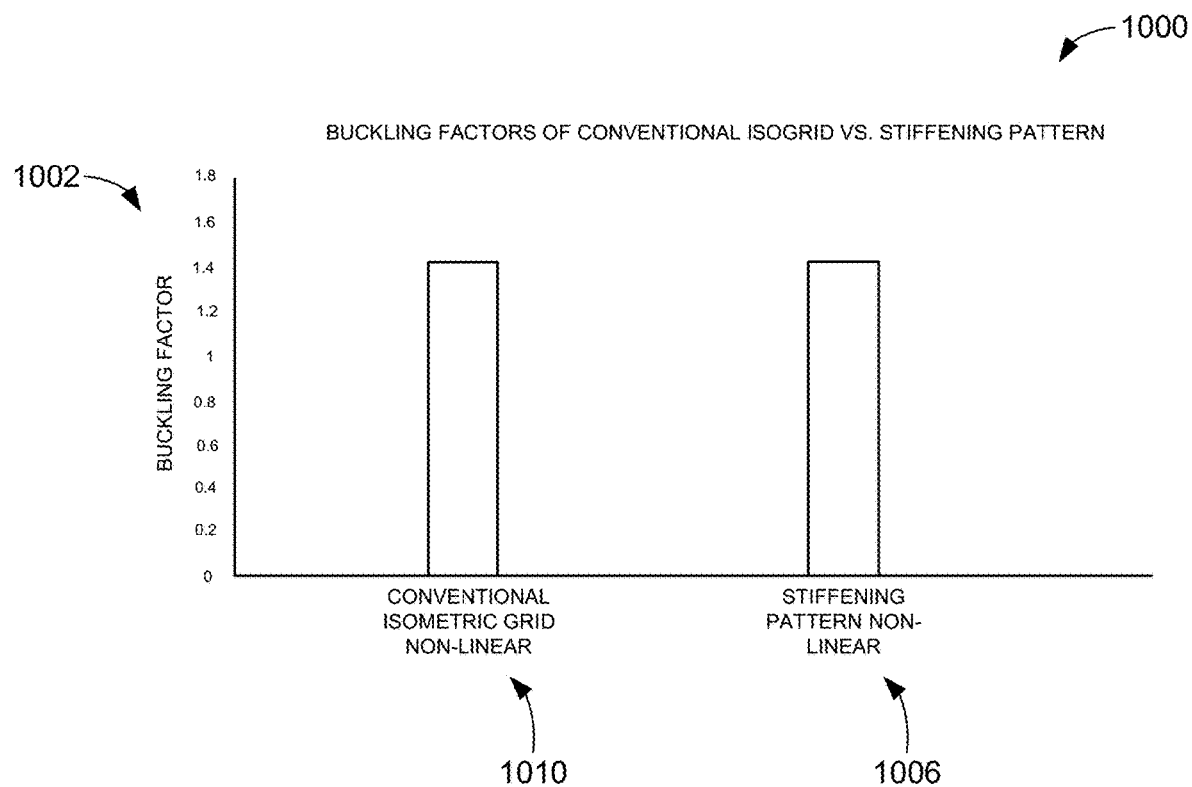
FIG. 10 is a diagram of buckling factors for conventional isogrid structures and for structures including the stiffening patterns of FIGS. 3A-9.

FIG. 10 is a diagram 1000 of buckling factors for conventional isogrid structures and for structures including the stiffening patterns of FIGS. 3A-9 (e.g., the cylindrical structure model 900). The buckling factor 1002 is indicative of the safety factor of a material for buckling at critical loads, or a ratio of the capability of the structure to the design requirement of the structure. A higher buckling factor 1002 is indicative of a lower propensity for buckling of the structure. In a non-linear FEA buckling factor analysis, the lowest buckling factor relative to the applied critical load is determined when the critical load is applied gradually in discrete loading steps. In the experimental FEA results shown in the diagram 1000, a first buckling factor 1006 determined in a non-linear buckling factor analysis is shown for the cylindrical structure model 900 implementing stiffening patterns disclosed herein. In the experimental FEA results shown in the diagram 1000, a second buckling factor 1010 determined in a non-linear buckling factor analysis is shown for a structure including a conventional isogrid (not shown).

In FIG. 10, the first buckling factor 1006 is approximately 1.4 and the second buckling factor 1010 is approximately 1.4. The first buckling factor 1006 determined for the cylindrical structure model 900 including the stiffening patterns disclosed herein meets the second buckling factor 1010 for conventional isogrid structures, while having increased manufacturability and decreased material usage.

Figure 11:
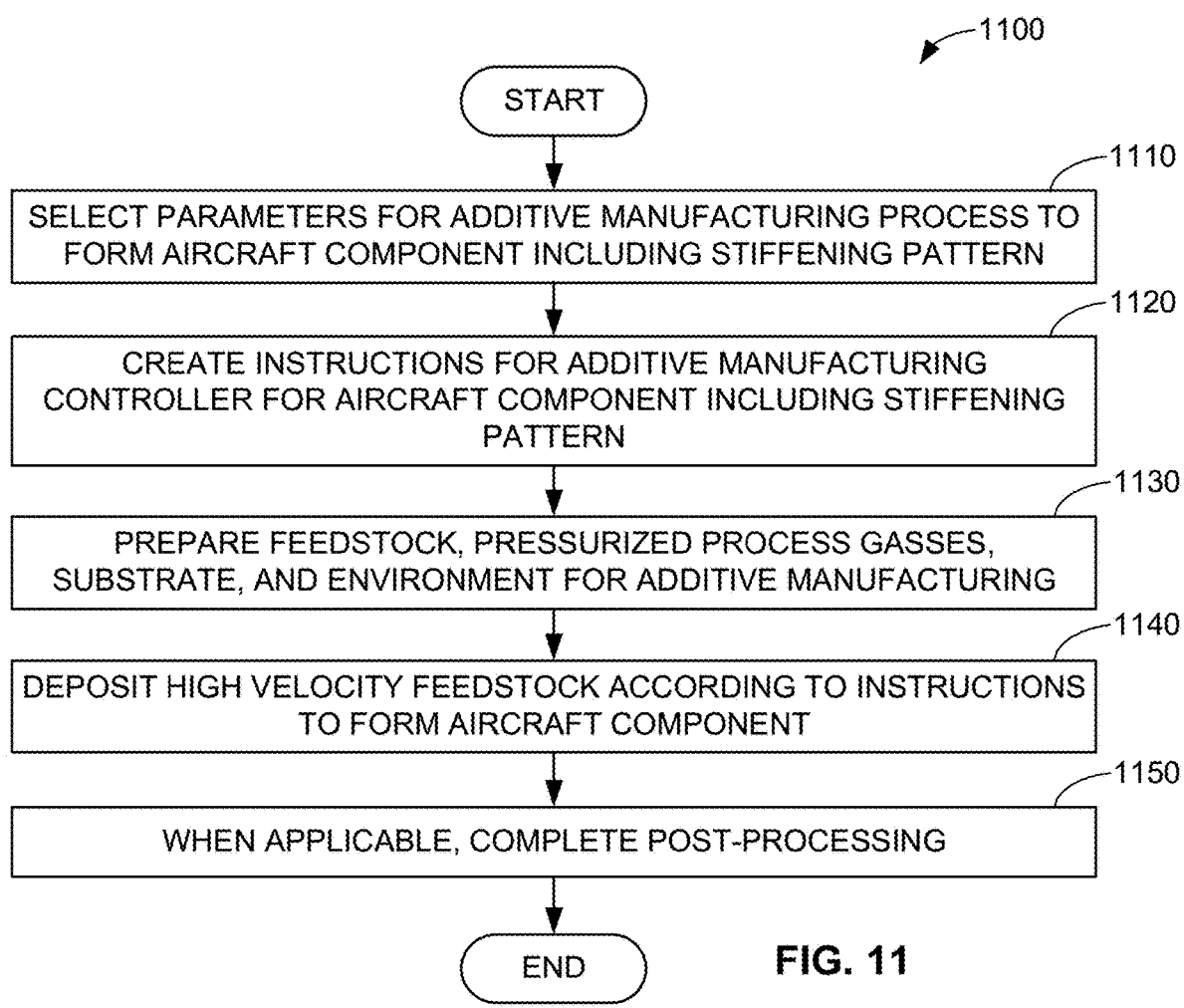
FIG. 11 is a flowchart representative of an example method of assembly of an aircraft component including the stiffening pattern for unit cell structures of FIGS. 3A-8.

FIG. 11 is a flowchart representative of an example method 1100 to assemble an aircraft component and/or an engine component (e.g., a structure) including the stiffening pattern for unit cell structures of FIGS. 3A-9. The method 1100 begins with selecting parameters for an additive manufacturing process to form the component. (Block 1110). For example, material, nozzle geometry, nozzle tool-path and surface speed, gas composition, pressure and temperature, number of passes to accomplish desired thickness, etc. One or more process simulations can be completed to assure correct part coverage and thickness and/or to optimize or otherwise improve the process parameters selection for the component.

The method 1100 proceeds by creating executable instructions for an additive manufacturing tool to form the aircraft component and/or the engine component (e.g., a bypass duct, a fan casing, a compressor casing, cowls, a nacelle, etc.) including the stiffening pattern. (Block 1120). The instructions are created based on, for example, a 3D part file of the component and/or a 3D mesh (e.g., a stereolithography file (.stl), etc.) of the component and the selected parameters. The instructions can include one or more tool movement patterns, deposition speeds, etc., to form the aircraft component and/or the engine component. The materials to be used in forming the component (e.g., feedstock, process gas, platform, substrate, and/or environment, etc.) are prepared. (Block 1130). The method 1100 proceeds with the formation of the component by the tool according to the provided instructions. (Block 1140).

Any post-processing machining (e.g., subtractive manufacturing, milling operations, etc.) is completed on the aircraft component and/or the engine component to achieve, for example, increased tolerances and minute features of the component. (Block 1150). In some examples, no post-processing machining is completed. After block 1150, the method 1100 ends with generation and output of the aircraft component and/or the engine component.

A flowchart representative of example hardware logic, machine readable instructions, hardware implemented state machines, and/or any combination thereof is shown in FIG. 11. The machine readable instructions may be one or more executable programs or portion(s) of an executable program for execution by a computer processor such as the processor 1212 shown in the example processor platform 1200 discussed below in connection with FIG. 12. The computer processor is used to drive an additive manufacturing apparatus to execute the process 1100 to manufacture one or more aircraft components and/or engine components. The program may be embodied in software stored on a non-transitory computer readable storage medium such as a CD-ROM, a floppy disk, a hard drive, a DVD, a Blu-ray disk, or a memory associated with the processor 1212, but the entire program and/or parts thereof could alternatively be executed by a device other than the processor 1212 and/or embodied in firmware or dedicated hardware. Further, although the example program is described with reference to the flowchart illustrated in FIG. 11, many other methods of implementing the example manufacturing process to form an example aircraft component (e.g., a structure) including the stiffening pattern for unit cell structures of FIGS. 3A-7 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIG. 11 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

Figure 12:
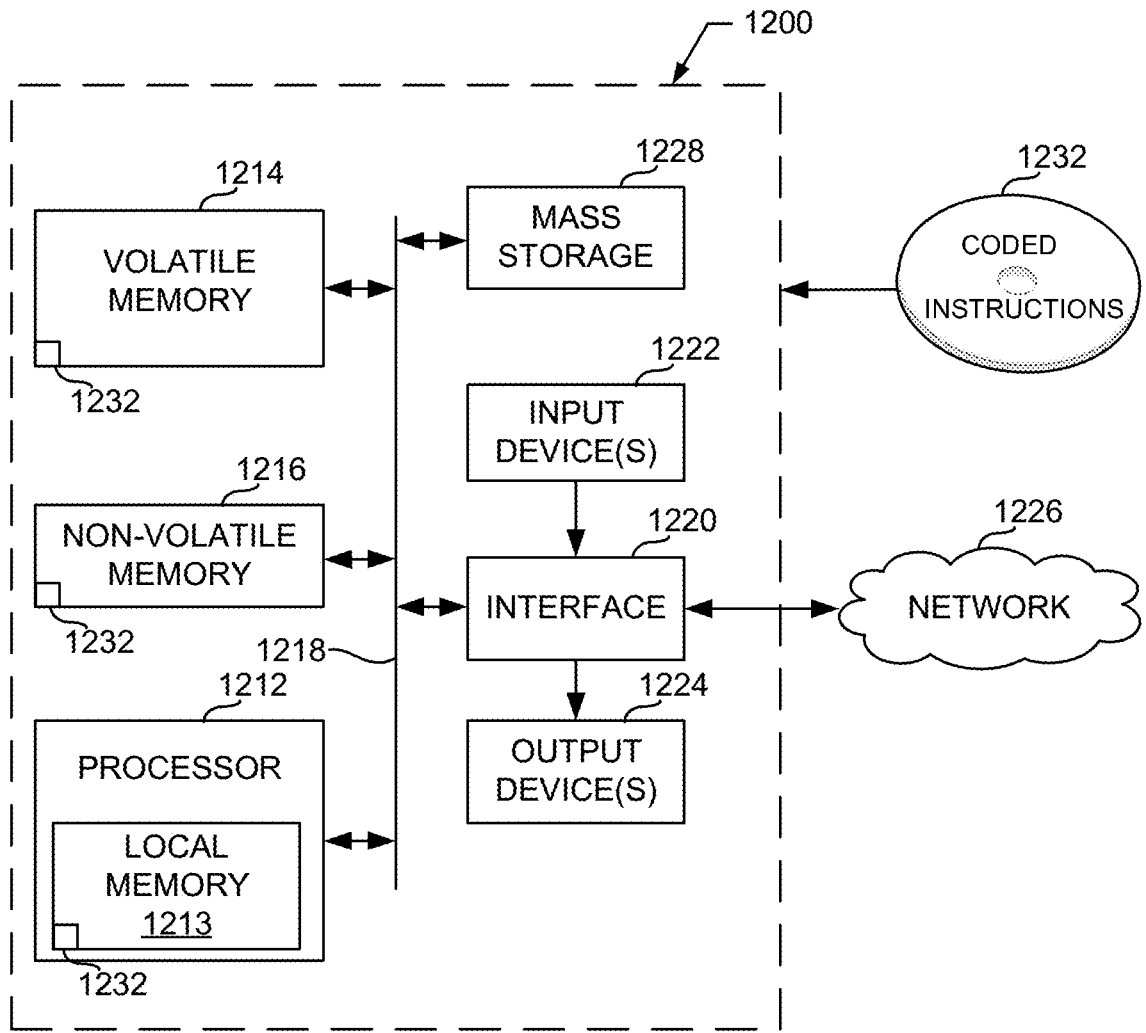
FIG. 12 is a block diagram of an example processor platform structured to execute the instructions of FIG. 11 to drive and/or otherwise control an additive manufacturing device to execute an example manufacturing process to form an example structure including the stiffening pattern for unit cell structures of FIGS. 3A-7.

FIG. 12 is a block diagram of an example processor platform 1200 structured to execute the instructions of FIG. 11 to drive and/or otherwise control an additive manufacturing device (e.g., PBF, EBM, CSAM, SLS, DMLS or tool, etc.) to execute an example manufacturing process to form an example aircraft component and/or an engine component (e.g., a structure) including the stiffening pattern for unit cell structures of FIGS. 3A-7. The processor platform 1200 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1200 of the illustrated example includes a processor 1212. The processor 1212 of the illustrated example is hardware. For example, the processor 1212 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 1212 implements a controller for the additive manufacturing process of FIG. 11 including the method 1100.

The processor 1212 of the illustrated example includes a local memory 1213 (e.g., a cache). The processor 1212 of the illustrated example is in communication with a main memory including a volatile memory 1214 and a non-volatile memory 1216 via a bus 1218. The volatile memory 1214 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1220. The interface circuit 1220 may be implemented by any type of interface standard, such as an Ethernet interface, a universal serial bus (USB), a Bluetooth® interface, a near field communication (NFC) interface, and/or a PCI express interface.

In the illustrated example, one or more input devices 1222 are connected to the interface circuit 1220. The input device(s) 1222 permit(s) a user to enter data and/or commands into the processor 1212. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1224 are also connected to the interface circuit 1220 of the illustrated example. The output devices 1224 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1220 of the illustrated example, thus, typically includes a graphics driver card, a graphics driver chip and/or a graphics driver processor.

The interface circuit 1220 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1226. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, redundant array of independent disks (RAID) systems, and digital versatile disk (DVD) drives.

The machine executable instructions 1232 of FIG. 11 may be stored in the mass storage device 1228, in the volatile memory 1214, in the non-volatile memory 1216, and/or on a removable non-transitory computer readable storage medium such as a CD or DVD.

From the foregoing, it will be appreciated that example methods, apparatus and articles of manufacture have been disclosed for stiffening patterns for unit cell structures including opposing unit cells joined at nodes. Examples disclosed have increased aerodynamic properties compared to conventional isogrid structures and can be formed using additive manufacturing processes such as PBF, EBM, CSAM, SLS, DMLS or tool, etc.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

Further aspects of the invention are provided by the subject matter of the following clauses:

1. A structure of an engine component, comprising a first plurality of unit cells offset from a neutral plane in a first direction, a second plurality of unit cells offset from the neutral plane in a second direction, and a plurality of nodes joining ones of the first plurality of unit cells and ones of the second plurality of unit cells, wherein the first plurality of unit cells and the second plurality of unit cells are arranged in pairs such that ones of the first plurality of unit cells are laterally adjacent to and interconnected with ones of the second plurality of unit cells, and wherein the structure is a stiffened structure.

2. A structure of any of the preceding clauses wherein, the first plurality of unit cells are aligned in a first protruding plane, and the second plurality of unit cells are aligned in a second recessed plane, such that the interconnected, laterally adjacent pairs of unit cells from the first plurality cells and unit cells from the second plurality of unit cells define a solid stiffened structure that alternates between the first protruding plane and the second recessed plane.

3. A structure of any of the preceding clauses wherein, the first and second surfaces offset from each other in a normal direction to the first and second surfaces, and a plurality of nodes joining the first plurality of unit cells and the second plurality of unit cells to form a stiffening pattern.

4. A structure of any of the preceding clauses wherein the structure forms at least a portion of a cylindrical or frusto-conical structure, the first direction is a centerline axis, the second direction is a circumferential direction, and the third direction is a radial direction, and the second surface is radially farther from the centerline axis than the first surface.

5. A structure of any of the preceding clauses wherein the structure includes a panel and the third direction extends perpendicular to an equivalent neutral bending plane for the panel.

6. A structure of any of the preceding clauses wherein the cylindrical structure forms at least a portion of a duct of a turbofan.

7. A structure of any of the preceding clauses wherein at least one unit cell of the first plurality of unit cells or the second plurality of unit cells is trigonal.

8. A structure of any of the preceding clauses further including a plurality of transition edges further joining the first plurality of unit cells, the second plurality of unit cells, and the plurality of nodes.

9. A structure of any of the preceding clauses wherein at least one unit cell of the first plurality of unit cells or the second plurality of unit cells is a different size from at least one other unit cell of the first plurality of unit cells or the second plurality of unit cells.

10. A structure of any of the preceding clauses wherein at least one unit cell of the first plurality of unit cells or the second plurality of unit cells is a different geometric shape from at least one other unit cell of the first plurality of unit cells or the second plurality of unit cells.

11. A structure of any of the preceding clauses wherein at least one node of the plurality of nodes is a blended node.

12. A structure of any of the preceding clauses wherein the first plurality of unit cells forms a first isogrid and the second plurality of unit cells forms a second isogrid.

13. A structure apparatus surrounding a gas turbine, the structure comprising a first grid of unit cells defining a first surface, a second grid of unit cells defining a second surface, the first surface offset from the second surface in a first direction to increase a moment of inertia of the structure, ones of the first grid of unit cells alternating with ones of the second grid of unit cells such that the unit cells are laterally adjacent and wherein the first direction is normal to the first grid of unit cells and the second grid of unit cells, and a plurality of nodes joining the first grid of unit cells with the second grid of unit cells.

14. A structure surrounding a gas turbine, the structure comprising a first plurality of unit cells, a second plurality of unit cells, the first plurality of unit cells offset from the second plurality of unit cells in a first direction to increase a moment of inertia of the structure, ones of the first plurality of unit cells alternating with ones of the second plurality of unit cells such that the unit cells are laterally adjacent, and the first and second pluralities of unit cells are offset from each other and with respect to a neutral plane that defines a center line through the structure, and a plurality of nodes joining the first plurality of unit cells with the second plurality of unit cells.

15. A structure of any of the preceding clauses further including a plurality of transition edges to further join the first grid of unit cells and the second grid of unit cells.

16. A structure of any of the preceding clauses wherein the first grid of unit cells is a first lattice of trigonal unit cells and the second grid of unit cells is a second grid of trigonal unit cells.

17. A structure of any of the preceding clauses wherein the first grid of unit cells is a first grid of trigonal unit cells of different sizes and the second grid of unit cells is a second grid of trigonal unit cells of different sizes.

18. A structure of any of the preceding clauses wherein the first grid of unit cells is a first grid including trigonal unit cells and rectangular unit cells and the second grid of unit cells is a second grid including trigonal unit cells and hexagonal unit cells.

19. A structure of any of the preceding clauses wherein a transition edge of the transition edges interfaces with a first edge of a first unit cell of the first grid of unit cells, a second edge of a second unit cell of the second grid of unit cells, and a node of the plurality of nodes.

20. A structure of any of the preceding clauses wherein the structure is cylindrical and associated with an exterior of a duct of a turbofan.

21. A structure of any of the preceding clauses wherein locations of the plurality of nodes are equidistant.

22. A structure of any of the preceding clauses wherein the circumferential structure is a unitary structure.

23. A unit cell structure of an aircraft component, comprising, a first plurality of unit cells, a second plurality of unit cells offset from the first plurality of unit cells in a first direction, the first plurality of unit cells and second plurality of unit cells forming opposing surfaces, ones of the first plurality of unit cells alternating with ones of the second plurality of unit cells such that the unit cells are laterally adjacent, and the first direction orthogonal to the first plurality of unit cells and the second plurality of unit cells, and a plurality of nodes joining the first plurality of unit cells and the second plurality of unit cells to form a stiffening pattern.

24. A unit cell structure of an aircraft component, comprising, a first plurality of unit cells, a second plurality of unit cells offset from the first plurality of unit cells in a first direction, the first plurality of unit cells and second plurality of unit cells forming opposing surfaces, ones of the first plurality of unit cells alternating with ones of the second plurality of unit cells such that the unit cells are laterally adjacent, the first and second surfaces offset from each other and with respect to a neutral plane that defines a center line through the unit cell structure, and a plurality of nodes joining the first plurality of unit cells and the second plurality of unit cells to stiffen the unit cell structure.

25. A unit cell structure of an aircraft component, comprising, a first plurality of unit cells, a second plurality of unit cells offset from the first plurality of unit cells in a first direction, the first plurality of unit cells and second plurality of unit cells forming opposing surfaces, ones of the first plurality of unit cells alternating with ones of the second plurality of unit cells such that the unit cells are laterally adjacent, and the first direction orthogonal to the first and second surfaces, and a plurality of nodes joining the first plurality of unit cells and the second plurality of unit cells to form a stiffening pattern.

26. A structure of any of the preceding clauses wherein a first unit cell of the first plurality of unit cells is a first trigonal unit cell and a second unit cell of the second plurality of unit cells is a second trigonal unit cell.

27. A structure of any of the preceding clauses wherein a first unit cell of the first plurality of unit cells is a first trigonal unit cell and a second unit cell of the second plurality of unit cells is a second trigonal unit cell of a different size.

28. An apparatus of any of the preceding clauses wherein a first unit cell of the first plurality of unit cells is a first trigonal unit cell and a second unit cell of the second plurality of unit cells is a first hexagonal unit cell.

29. A structure of any of the preceding clauses wherein the first trigonal unit cell is connected at a first edge to a transition edge, the transition edge connected to a second edge of the second unit cell.

30. A structure of any of the preceding clauses wherein the first plurality of unit cells defines a first surface and the second plurality of unit cells defines a second surface.

31. A unit cell structure of any of the preceding clauses, wherein the first plurality of unit cells are in a first protruding plane and the second plurality of unit cells are in a second recessed plane.

32. A unit cell structure of any of the preceding clauses, wherein the first surface is offset less than 0.3 inches from the second surface.

33. A unit cell structure of any of the preceding clauses, wherein the first plurality of unit cells is offset less than 0.3 inches from the second plurality of unit cells.

34. A unit cell structure of any of the preceding clauses, wherein the first plurality of unit cells in the first protruding plane is offset less than 0.3 inches from the second plurality of unit cells in the recessed plane.

35. A structure of any of the preceding clauses wherein a first portion of the first plurality of unit cells has one or more different dimensions from a second portion of the first plurality of unit cells.

36. An additively manufactured monolithic isogrid structure, comprising a first plurality of trigonal unit cells disposed on a first side of a neutral plane for bending of the isogrid structure, a second plurality of trigonal unit cells disposed on a second side of the neutral plane, the second side opposite the first side, a plurality of nodes, and a plurality of transition edges, the plurality of nodes and the plurality of transition edges connecting the first and second pluralities of unit cells.

37. An apparatus of any of the preceding clauses, wherein at least a portion of the isogrid structure includes a curvature.

38. An integral additively manufactured grid structure, comprising a first grid of square unit cells defining a first surface, the first grid of square unit cells disposed on a first side of a neutral plane for bending of the grid structure, a second grid of square unit cells defining a second surface, the second grid of square unit cells disposed on a second side of the neutral plane opposite the first side, the second grid joined to the first grid with pluralities of (a) nodes intersecting the neutral plane and (b) transition edges intersecting the neutral plane.

39. A monolithic structure having unit cells, comprising a first portion of the unit cells, a second portion of the unit cells disposed opposite a neutral plane from the first portion of the unit cells, and a plurality of (a) nodes and (b) transition edges joining the unit cells.

40. An integral structure that is additively manufactured, comprising a first grid of unit cells opposite a second grid of unit cells, a neutral plane disposed between the first grid of unit cells and the second grid of unit cells, a plurality of nodes, and a plurality of transition edges, the transition edges and the nodes coupling the first and second lattices of unit cells, the neutral plane extending through at least a portion of the plurality of (a) nodes and (b) unit cells.

41. An integral additively manufactured grid structure, comprising a first plurality of square unit cells aligned in a first plane, the first plurality of square unit cells disposed on a first side of a neutral plane for bending of the grid structure, a second plurality of square unit cells aligned in a second plane, the second plurality of square unit cells disposed on a second side of the neutral plane opposite the first side, the second plurality joined to the first plurality with pluralities of (a) nodes intersecting the neutral plane and (b) transition edges intersecting the neutral plane.

42. An integral additively manufactured grid structure, comprising a first plurality of square unit cells disposed on a first side of a neutral plane for bending of the grid structure, a second plurality of square unit cells disposed on a second side of the neutral plane opposite the first side, the second plurality joined to the first plurality with pluralities of (a) nodes intersecting the neutral plane and (b) transition edges intersecting the neutral plane.

The following claims are hereby incorporated into this Detailed Description by this reference, with each claim standing on its own as a separate embodiment of the present disclosure.

What is claimed is:

1. A unit cell structure of an engine component, comprising:
    a first plurality of unit cells;
    a second plurality of unit cells, the first plurality of unit cells offset from the second plurality of unit cells in a first direction, ones of the first plurality of unit cells alternating with ones of the second plurality of unit cells such that the unit cells are laterally adjacent; and
    a plurality of nodes joining ones of the first plurality of unit cells and ones of the second plurality of unit cells, wherein the first and second pluralities of unit cells are offset from each other and with respect to a neutral plane that defines a center line through the structure.

2. The unit cell structure of claim 1, wherein the first plurality of unit cells is offset from the second plurality of unit cells to increase a moment of inertia of the structure.

3. The unit cell structure of claim 1, wherein the first plurality of unit cells are aligned in a first protruding plane, and the second plurality of unit cells are aligned in a second recessed plane, such that the interconnected, laterally adjacent pairs of unit cells from the first plurality cells and unit cells from the second plurality of unit cells define a solid stiffened structure that alternates between the first protruding plane and the second recessed plane.

4. The unit cell structure of claim 1, wherein at least one unit cell of the first plurality of unit cells or the second plurality of unit cells is a different size from at least one other unit cell of the first plurality of unit cells or the second plurality of unit cells.

5. The unit cell structure of claim 1, wherein at least one unit cell of the first plurality of unit cells or the second plurality of unit cells is a different geometric shape from at least one other unit cell of the first plurality of unit cells or the second plurality of unit cells.

6. The unit cell structure of claim 1, wherein a first unit cell of the first plurality of unit cells is a first trigonal unit cell and a second unit cell of the second plurality of unit cells is a second trigonal unit cell of a different size.

7. The unit cell structure of claim 1, wherein a first unit cell of the first plurality of unit cells is a first trigonal unit cell and a second unit cell of the second plurality of unit cells is a first hexagonal unit cell.

8. The unit cell structure of claim 1, wherein the first plurality of unit cells defines a first surface and the second plurality of unit cells defines a second surface.

9. The unit cell structure of claim 8, wherein the first surface is offset less than 0.3 inches from the second surface.

10. A structure apparatus surrounding a gas turbine, the structure comprising:
    a first grid of unit cells defining a first surface;
    a second grid of unit cells defining a second surface, the first surface offset from the second surface in a first direction to increase a moment of inertia of the structure, ones of the first grid of unit cells alternating with ones of the second grid of unit cells such that the unit cells are laterally adjacent and wherein the first direction is normal to the first grid of unit cells and the second grid of unit cells; and
    a plurality of nodes joining the first grid of unit cells with the second grid of unit cells.

11. The structure of claim 10, wherein the first and second surfaces offset from each other in a normal direction to the first and second surfaces, and a plurality of nodes joining the first grid of unit cells and the second grid of unit cells to form a stiffening pattern.

12. The structure of claim 10, further including a plurality of transition edges to further join the first grid of unit cells and the second grid of unit cells.

13. The structure of claim 12, wherein a transition edge of the transition edges interfaces with a first edge of a first unit cell of the first grid of unit cells, a second edge of a second unit cell of the second grid of unit cells, and a node of the plurality of nodes.

14. The structure of claim 10, wherein the first grid of unit cells is a first grid including trigonal unit cells and rectangular unit cells and the second grid of unit cells is a second grid including trigonal unit cells and hexagonal unit cells.

15. The structure of claim 10, wherein the first grid of unit cells are in a first protruding plane and the second grids of unit cells are in a second recessed plane.

16. The unit cell structure of claim 15, wherein the first grid of unit cells in the first protruding plane is offset less than 0.3 inches from the second grid of unit cells in the recessed plane.

17. A monolithic panel having unit cells, comprising:
    a first portion of the unit cells defining a first surface;
    a second portion of the unit cells defining a second surface, the second surface disposed opposite a neutral plane from the first surface; and
    a plurality of (a) nodes and (b) transition edges joining the first and second surfaces to form a continuous and solid surface having a stiffening pattern.

18. An integral structure that is additively manufactured, comprising:
    a first grid of unit cells opposite a second grid of unit cells;
    a neutral plane disposed between the first grid of unit cells and the second grid of unit cells;
    a plurality of nodes; and
    a plurality of transition edges, the transition edges and the nodes coupling the first and second grids of unit cells to form a solid and continuous surface, the neutral plane extending through at least a portion of the plurality of (a) nodes and (b) unit cells.

19. An integral additively manufactured grid structure, comprising:
    a first plurality of square unit cells disposed on a first side of a neutral plane for bending of the grid structure; and
    a second plurality of square unit cells disposed on a second side of the neutral plane opposite the first side, the first plurality of square unit cells offset from the second plurality of square unit cells in a first direction, the second plurality joined to the first plurality with pluralities of (a) nodes intersecting the neutral plane and (b) transition edges intersecting the neutral plane.

20. The integral additively manufactured grid structure of claim 19, wherein the first plurality of square unit cells are aligned in a first plane and the second plurality of square until cells are aligned in a second plane.

* * * * *